US012689610B2

(12) United States Patent
Brecl et al.

(10) Patent No.: US 12,689,610 B2
(45) Date of Patent: Jul. 21, 2026

(54) END-TO-END NETWORK SECURITY SERVICE FOR WORKLOADS ACROSS DIFFERENT NETWORK ENVIRONMENTS

(71) Applicant: Level 3 Communications, LLC, Denver, CO (US)

(72) Inventors: Peter Brecl, Highlands Ranch, CO (US); Steven Casey, Littleton, CO (US); Kevin M. McBride, Denver, CO (US)

(73) Assignee: Level 3 Communications, LLC, Denver, CO (US)

( * ) Notice: Subject to any disclaimer, the term of this patent is extended or adjusted under 35 U.S.C. 154(b) by 103 days.

(21) Appl. No.: 18/786,460

(22) Filed: Jul. 27, 2024

(65) Prior Publication Data

US 2024/0388567 A1     Nov. 21, 2024

Related U.S. Application Data

(62) Division of application No. 17/524,982, filed on Nov. 12, 2021, now Pat. No. 12,081,517.

(60) Provisional application No. 63/137,464, filed on Jan. 14, 2021, provisional application No. 63/113,647, filed on Nov. 13, 2020.

(51) Int. Cl.
| | |
|---|---|
| *G06F 9/455* | (2018.01) |
| *H04L 9/40* | (2022.01) |
| *H04L 12/46* | (2006.01) |
| *H04L 41/14* | (2022.01) |
| *H04L 43/0876* | (2022.01) |
| *H04L 45/74* | (2022.01) |
| *H04L 61/4511* | (2022.01) |

(Continued)

(52) U.S. Cl.
CPC ...... *H04L 63/0209* (2013.01); *H04L 12/4633* (2013.01); *H04L 41/145* (2013.01); *H04L 43/0876* (2013.01); *H04L 45/74* (2013.01); *H04L 61/4511* (2022.05); *H04L 63/1416* (2013.01); *H04L 67/10* (2013.01); *H04L 61/5007* (2022.05)

(58) Field of Classification Search
None
See application file for complete search history.

(56) References Cited

U.S. PATENT DOCUMENTS

| | | | |
|---|---|---|---|
| 10,348,767 | B1 | 7/2019 | Lee |
| 10,382,401 | B1 | 8/2019 | Lee |

(Continued)

*Primary Examiner* — Christopher B Robinson

(57) ABSTRACT

Implementations include providing security services to workloads deployed across various types of network environments, such as public networks, private networks, hybrid networks, customer premise network environments, and the like, by redirecting traffic intended for the service device through a security environment of the first network. After application of the security features to the incoming traffic, the "clean" traffic may be transmitted to the service device instantiated on the separate network via a tunnel. Redirection of incoming traffic to the security-providing first network may include correlating a network address of the service device to a reserved network address of a block of reserved addresses and updating a Domain Name Server (DNS) or other address resolving system with the reserved address. The return transmission tunnel may be established between the security environment and the network address of the service device.

6 Claims, 10 Drawing Sheets

(51) Int. Cl.
    *H04L 67/10*       (2022.01)
    *H04L 61/5007*    (2022.01)

(56)                References Cited

U.S. PATENT DOCUMENTS

| | | | |
|---|---|---|---|
| 2013/0297769 A1* | 11/2013 | Chang | G06F 9/5077 |
| | | | 709/224 |
| 2013/0346628 A1* | 12/2013 | Canion | H04L 63/101 |
| | | | 709/245 |
| 2018/0062933 A1* | 3/2018 | Hira | G06F 11/1482 |
| 2018/0131714 A1 | 5/2018 | Maestas | |
| 2018/0295134 A1 | 10/2018 | Gupta | |
| 2018/0343316 A1 | 11/2018 | Meyer | |
| 2019/0087844 A1 | 3/2019 | Leekley | |
| 2019/0104022 A1* | 4/2019 | Power | H04L 41/0895 |
| 2019/0306185 A1 | 10/2019 | Katrekar | |
| 2020/0007414 A1 | 1/2020 | Smith | |
| 2020/0358858 A1 | 11/2020 | Shribman | |
| 2022/0158975 A1 | 5/2022 | Brecl | |

* cited by examiner

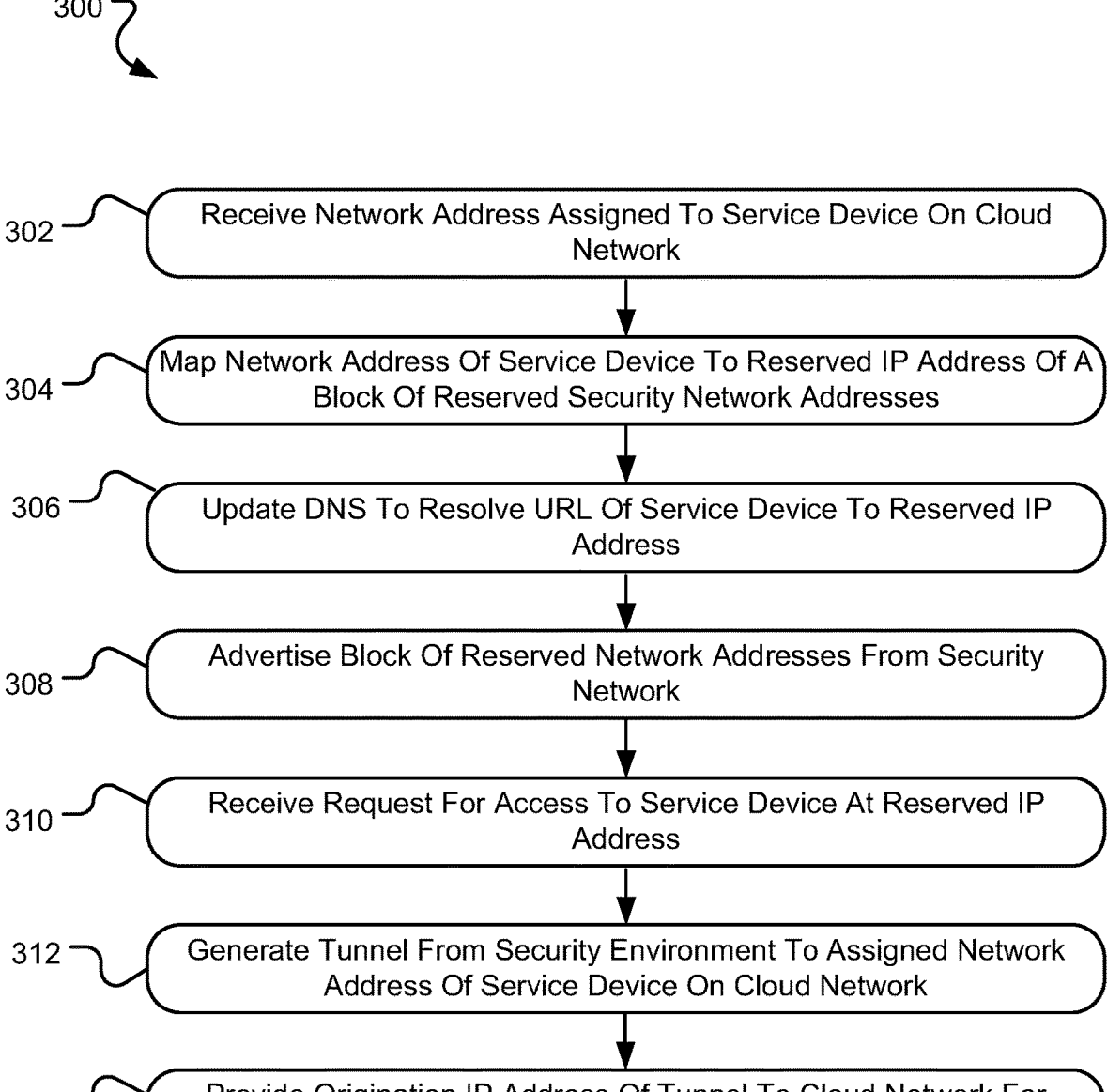

300

302 — Receive Network Address Assigned To Service Device On Cloud Network

304 — Map Network Address Of Service Device To Reserved IP Address Of A Block Of Reserved Security Network Addresses 306 — Update DNS To Resolve URL Of Service Device To Reserved IP Address 308 — Advertise Block Of Reserved Network Addresses From Security Network 310 — Receive Request For Access To Service Device At Reserved IP Address 312 — Generate Tunnel From Security Environment To Assigned Network Address Of Service Device On Cloud Network 314 — Provide Origination IP Address Of Tunnel To Cloud Network For Inclusion In Firewall Service 316 — Transmit Scrubbed Traffic Through Tunnel To Service Device On Cloud Network

FIG. 3

500

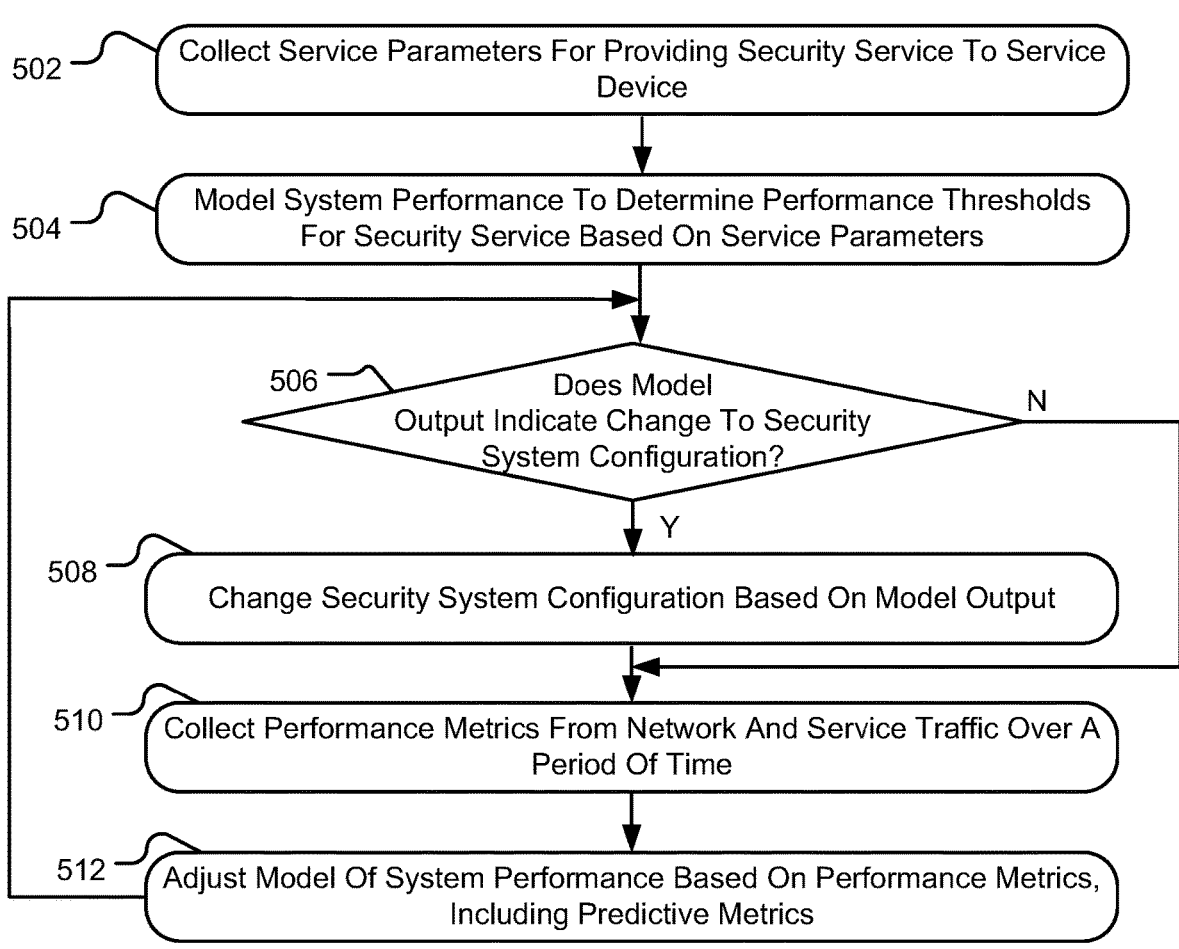

502 — Collect Service Parameters For Providing Security Service To Service Device 504 — Model System Performance To Determine Performance Thresholds For Security Service Based On Service Parameters 506 — Does Model Output Indicate Change To Security System Configuration?    N

Y

508 — Change Security System Configuration Based On Model Output

510 — Collect Performance Metrics From Network And Service Traffic Over A Period Of Time 512 — Adjust Model Of System Performance Based On Performance Metrics, Including Predictive Metrics

FIG. 5

900
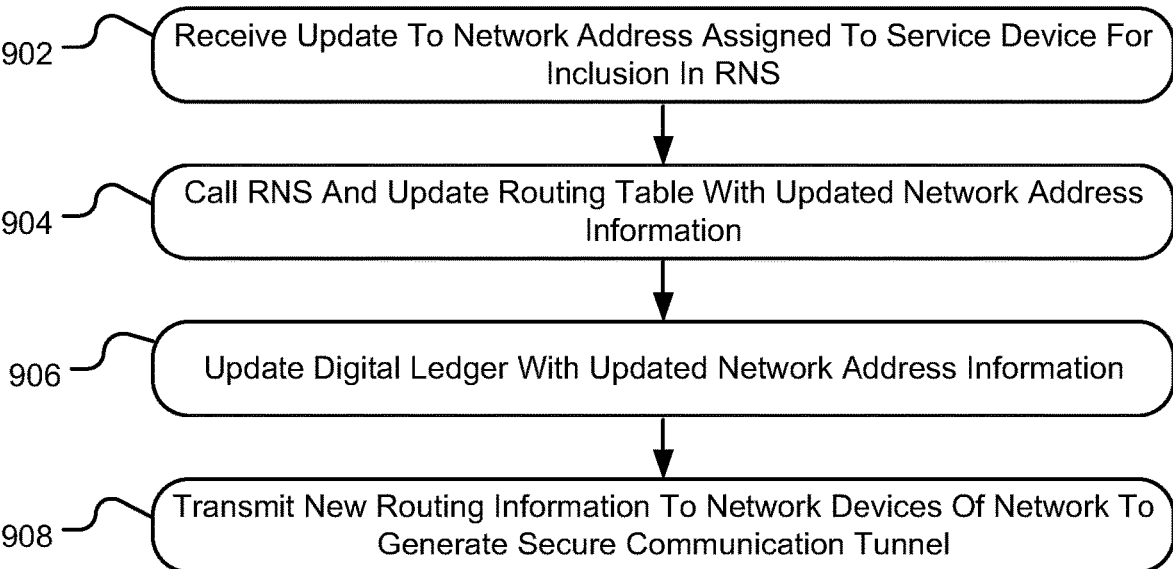
902 —⟋ Receive Update To Network Address Assigned To Service Device For Inclusion In RNS
904 —⟋ Call RNS And Update Routing Table With Updated Network Address Information
906 —⟋ Update Digital Ledger With Updated Network Address Information
908 —⟋ Transmit New Routing Information To Network Devices Of Network To Generate Secure Communication Tunnel
FIG. 9

END-TO-END NETWORK SECURITY SERVICE FOR WORKLOADS ACROSS DIFFERENT NETWORK ENVIRONMENTS

TECHNICAL FIELD

Embodiments of the present invention generally relate to systems and methods for managing security services in one or more networks, and more specifically for providing security services to workloads deployed across various types of networks, such as public, private, hybrid, and/or customer premise network environments.

BACKGROUND

Network service providers may use various platforms to provide all types of services to customers over a network and throughout the world. For example, television shows and movies may now be accessed from any number of Web sites, and the shows and movies may be served to customers from content-providing devices of a network of devices. In another example, access to a central database in a network may be provided for storage or data, files, information, etc. or an application server executing a program for use by customers to the network. Software updates and patches, once provided on discs and mailed to recipients, are now routinely distributed to devices through one or more network connections from software-providing devices. In general, many types of compute, storage, and/or network services are made available to relieve a customer's need to purchase and operate the service devices within their own network or location.

In some instances, service providers of a public network (such as the Internet) may suffer an attack by an actor or actors designed to gain access to the provider's network or device or to disrupt the operation of the network or device from providing services to other users. One such attack is known as a denial of service (DOS) attack. DOS attacks attempt to make content servers or other resources of a network unavailable to legitimate users by overwhelming the provider's equipment. In general, such attacks include flooding a content server or other type of device providing the content with phony requests for information from the device at such a frequency and volume as to impede other legitimate traffic or requests from being fulfilled by the content server. A distributed denial of service (DDOS) attack is similar in aim except that the requests for the content are received from more than one, often thousands, of unique Internet Protocol (IP) addresses or sources. As should be appreciated, such attacks, as well as other types of attacks on service providers, may negatively impact the ability of providing a service to legitimate requesters, effectively blocking the customers from receiving the requested service.

Techniques and systems have been developed and implemented to combat many types of attacks on network devices providing a service to requesting customers. For example, networks have developed techniques to analyze traffic intended for a service-providing device of a network and determine the legitimacy of the incoming traffic through several methods, such as verified or trusted source IP addresses, scanning a content of a request for potentially malicious or false information, and the like. Traffic deemed malicious or otherwise a part of an attack on the device may be removed, re-directed, or deleted to prevent the malicious traffic from reaching the service-providing device. Such scrubbing of incoming traffic to a service-providing device may itself be considered a service offered by a network to devices or networks in communication with the service-providing network. In general, service providers may contract with a network provider to house or otherwise support service-providing devices (such as application servers, databases, service-dedicated computing devices, etc.) and provide one or more security techniques from those devices. However, in many instances, service providers may locate the service-providing devices in particular networks, such as a customer-owned network or a cloud computing environment. Instantiating service-providing devices often means that service providers must contract with multiple network administrators to obtain security protection for their service-providing devices, which may be both time consuming and complicated to manage.

It is with these observations in mind, among other, that aspects of the present disclosure were conceived.

SUMMARY

One aspect of the present disclosure relates to a method for providing a security service to network communications. The method may include the operations of mapping a network address associated with a workload instantiated in a cloud network to an Internet Protocol (IP) address associated with a security environment of a backbone network, the cloud network different than the backbone network, updating a domain name server (DNS) to provide, based on receiving a Uniform Resource Locator (URL) associated with the workload, the IP address associated with the security environment, and routing a received communication to the security environment based on a header of the communication comprising the IP address, the security environment applying a security feature to the communication Another aspect of the present disclosure relates to a system for operating a network, the system comprising a processing device and a non-transitory computer-readable medium encoded with instructions. When executed by the processing device, the instructions cause the processing device to generate, based on a service parameter, a performance threshold value for providing a security service for network traffic corresponding to a destination workload, simulate, on a model of a network configuration, providing the security services for the network traffic, and select, based on a comparison of an output of the simulation to a performance threshold value, a network environment from a plurality of available network environments for instantiating the destination workload.

Yet another aspect of the present disclosure relates to a network device comprising a communication port communicating with a security service environment of a network, a processing device, and a non-transitory computer-readable medium encoded with instructions. When executed by the processing device, the instructions cause the processing device to, receive a dynamically assigned network address associated with a destination workload instantiated on a network environment, associate the network address with an identifier associated with the destination workload, and transmit, to a requesting device, the network address in response to receiving the identifier from the requesting device, the requesting device instantiating a secure communication tunnel with an endpoint at the network address.

BRIEF DESCRIPTION OF THE DRAWINGS

The foregoing and other objects, features, and advantages of the present disclosure set forth herein should be apparent from the following description of particular embodiments of those inventive concepts, as illustrated in the accompanying drawings. The drawings depict only typical embodiments of the present disclosure and, therefore, are not to be considered limiting in scope.

FIG. 3 is a flowchart illustrating a method for provide security services to devices or services deployed across various types of networks, according to aspects of the present disclosure.

FIG. 5 is a flowchart illustrating a method for utilizing network data performance metrics and other network information to provide security services to devices deployed across various types of networks, according to aspects of the present disclosure.

FIG. 9 is a flowchart illustrating a method for updating a Route Named Service device for dynamically configuring a security service environment, according to aspects of the present disclosure.

DETAILED DESCRIPTION

Aspects of the present disclosure involve systems, methods, computer program products, and the like, for providing security services to workloads deployed across various types of network environments, such as public networks, private networks, hybrid networks, customer premise network environments, and the like. In one particular embodiment of the present disclosure, a first network may provide a security service or features for a secondary service device instantiated in a separate network by redirecting traffic intended for the service device through a security environment of the first network. After application of the security features to the incoming traffic, the "clean" traffic may be transmitted to the service device instantiated on the separate network via a tunnel, such as a Generic Routing Encapsulation (GRE) tunnel. Redirection of incoming traffic to the security-providing first network may include correlating a network address of the service device to a reserved network address of a block of reserved addresses and updating a Domain Name Server (DNS) or other address resolving system with the reserved address. The return transmission tunnel may be established between the security environment and the network address of the service device. In this manner, the traffic intended for the service device may be directed through the security environment, regardless of which network in which the service device is instantiated. In some instances, redirection of the service traffic may occur for service devices with a statically or dynamically assigned network address, including dynamically establishing the return transmission tunnel to a dynamically assigned network address of the service device. Through the embodiments disclosed herein, security features, such as DDOS mitigation or other scrubbing features, may be applied for a service-providing device deployed across various types of networks.

Figure 1:
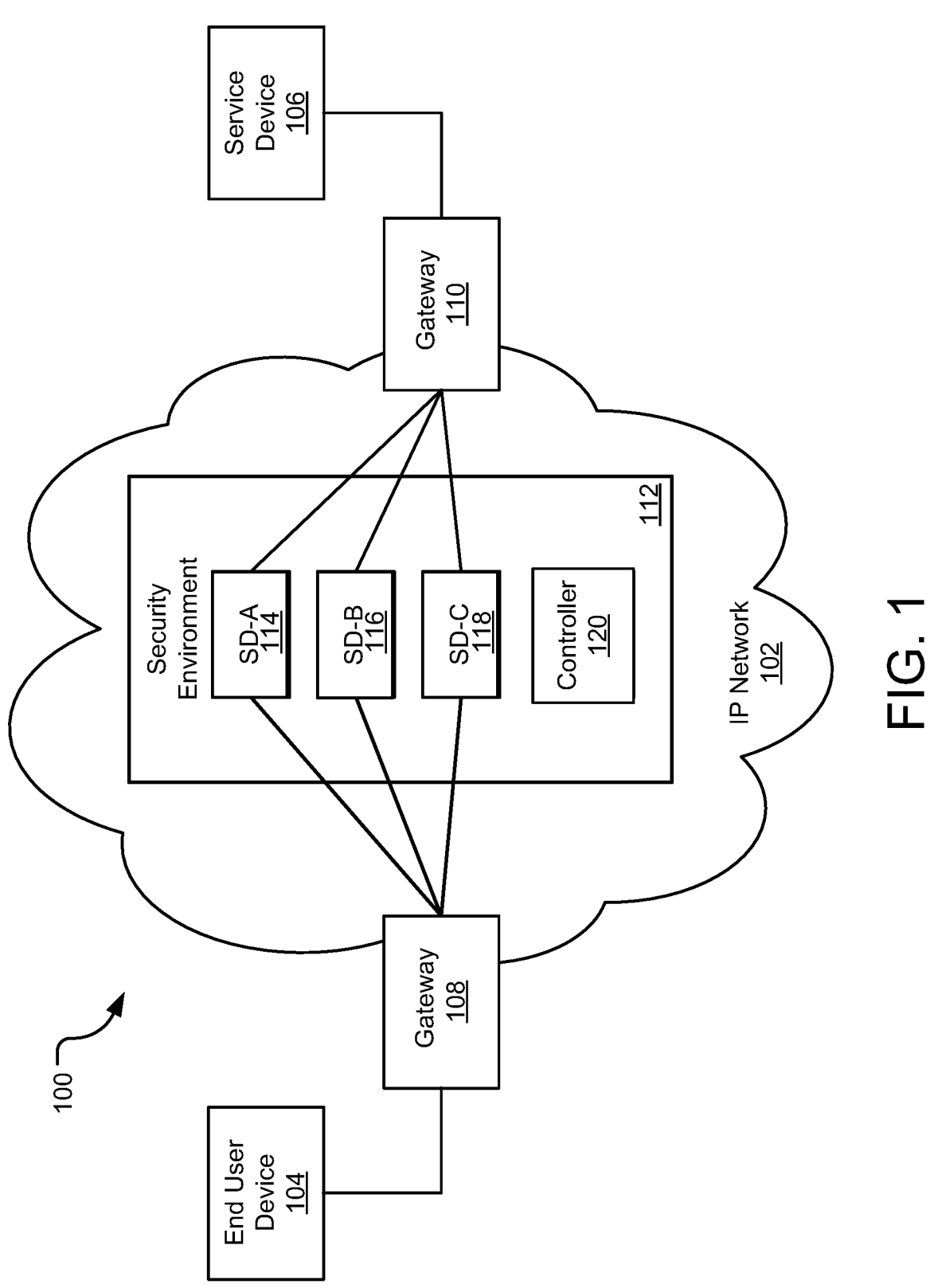
FIG. 1 is a schematic diagram illustrating an exemplary network environment operable to provide security services to networks or devices connected to an IP network, according to aspects of the present disclosure.

FIG. 1 is a schematic diagram illustrating an exemplary network environment 100 operable to provide security services to devices or virtual machines instantiated on an Internet Protocol (IP) environment 102 or other network environment, according to aspects of the present disclosure. In general, the environment 100 includes a security network (such as IP network 102) that connects secondary networks and/or devices to provide and receive one or more network services. In the particular example illustrated in FIG. 1, end user device 104 may communicate with service device 106 to receive one or more services from the service device. For example, service device 106 may provide multimedia or other content to end user device 104, may provide compute services for end user device, may store data or other information for end user device, and the like. Network 102 may provide the connection between the end user device 104 and the service device 106 and, in some instances, may apply one or more transmission features to the traffic transmitted between the devices. For example, network 102 may include a security environment 112 through which traffic from end user device 104 to service device 106 may be transmitted for application of one or more security features. In this manner, service device 106 or an operator or administrator of service device may request the security services from network 102 for traffic intended for the service device from one or more secondary devices, such as end user device 104. Both end user device 104 and service device 106 may connect to network 102 through the same or different gateway devices 108, 110, which may include any type of network edge devices that provide interfaces to connected devices or networks. In some instances, an administrator of service device 106 may include or instantiate the service device within network 102 such that the network may manage the flow of traffic to the service device through security environment 112. In other instances, the service device 106 may be instantiated in another network, such as a cloud computing environment, connected to network 102 via gateway 110 such that network 102 may provide the security services requested for the traffic intended for the service device.

Although described herein as a service device 106, it should be appreciated that service device may include any number of computing devices, including one or more virtual devices instantiated on one or more compute devices of a virtual network. In such instances, the service device 106 may also be referred to as a "workload" or "virtual service". Thus, service device 106 may or may not include a physical device for providing the service that is managed by a service providing entity. Rather, the service device 106 may also include one or more virtual machines, virtualized applications, serverless applications, or services instantiated on one or more compute devices of a secondary network to perform the operations of the service device. As further discussed below, a network address may be associated with the service device 106 from a network on which the device or workload is instantiated. For example, service device 106 may be instantiated in a cloud computing environment or other network accessible through a network connection and which may assign a network address to the service device, whether the service device comprises physical compute devices or virtual devices. The network address may point to a physical device or a virtual device for providing a service to an end user device 104 and is not necessarily associated with one physical computing device. Those of ordinary skill in the art will understand that instantiation of the service device 106 in a network may include one or several computing devices in communication to execute one or more programs to provide a requested service to an end user device 104.

To facilitate the transmission of communication packets/data between end user device 104 and service device 106 (or any other computing devices, users, networks, etc.), the network 102 may include numerous networking devices. Such devices or components may include, but are not limited to gateways, routers, route reflectors, and registrars, which enable communication and/or provide services across the IP network 102. Gateways 108, 110 may transmit and/or receive communication packets into and out of the network 102. Transmission of received packets through the network 102 may be performed by one or more other network devices connected between the gateways. Communication paths or wires may connect the components of the network 102 such that one or more packets may be transmitted between customers or networks via the components of the network 102.

In addition to routing communications between devices 104, 106, the network 102 may also provide one or more security services (or other types of services) to networks or devices connected to or associated with the core network 102. In one example, the network 102 may provide a scrubbing service or other defensive security service against DDOS attacks on a device connected to or associated with the network 102. As described in more detail below, a scrubbing service may direct communications or packets identified as a part of a DDOS attack to a scrubbing device, such as SD-A 114, before transmission to the destination device 106 or network. In some instances, the scrubbing device may identify those packets that are intended to overwhelm or otherwise harm the operation of the destination device 106 or network and remove the offending packets from the stream of traffic to the destination, while allowing legitimate requests or traffic to be transmitted to the destination device or network. To provide the scrubbing service to service device 106, the network may include a scrubbing architecture 112 or other security environment comprising one or more network scrubbing devices 114-118. A controller 120 may also be included in the security environment 112 or the network 102 for controlling one or more aspects of the security features, as discussed in more detail below.

The network 102 may be configured in any manner to facilitate the routing of communications through the network and to provide one or more services to customers of the network 102. For example, the network 102 may include a series of interconnected networking devices, such as routers and switches, that receive a communication, analyze the communication to determine a destination, and route the communication to a connected networking device to get the communication closer to a destination or egress point (such as gateway 110). To determine which routes through the network to utilize to transmit a received communication or packet, components of the network may receive route information through one or more route announcing sessions between the devices. These route announcing sessions provide routing information between the components of the network and between different networks so that components of the Internet and other networks may determine how to route received communication packets.

One particular example of the announcement of routing information occurs in a Border Gateway Protocol (BGP) announcement. In general, BGP information (or BGP session, BGP feed or BGP data) is a table of Internet Protocol (IP) prefixes which designate network connectivity between autonomous systems (AS) or separate networks. BGP information for a network route may include path (including next-hop information), network policies, and/or rulesets for transmission along the path, among other information. The BGP information may also include Interior Gateway Protocol (IGP) information for network routes within an Autonomous System (AS) or network and/or other network information that pertains to the transmission of traffic from the network. However, as described below, BGP information mainly describes routes used by the network 102 to connect to external networks or devices while IGP information describes routes through the backbone network to connect one edge device (such as gateway 108) to another edge device (such as gateway 110) through the network 102.

One or more of the components of the network 102 may announce, through a BGP session or other routing protocol announcement or advertisement, routes serviced by that component. For example, gateway 110 may provide a BGP announcement to other components in the network 102 that indicates which networks or devices (such as service device 106) that may be accessed through the gateway. Thus, the BGP announcement for gateway 110 may include a path and next-hop information that designates a path along which packets intended for service device 106 may be transmitted to or received from the connected device. The next-hop information generally identifies a particular device of the network 102 through which a destination device or address is available. For example, a particular Internet Protocol (IP) address associated with service device 106 may be announced from gateway 110 to other components of the network 102. Although discussed herein as BGP announcements or advertisements, it should be appreciated that the routing protocol advertisements may be either or both BGP routes between networks and IGP routes through IP network 102.

As mentioned above, the scrubbing architecture 112 of the network 102 may include one or more scrubbing devices 114-118 to provide scrubbing services for border networks, service device 106, or any other device or network connected to the network 102. Additional security features may also be provided to service device 106 or other devices by the security environment 112. For example, security environment 112 may provide a firewall service for gatekeeping communications into or out of the service device 106, secure Domain Name Server (DNS) security feature, anti-virus security, malware sandbox feature, content filtering, category filtering, web application protection, API defenses, and/or any other type of security services to protect the devices/communications connected to the network 102 from attack. These services may be installed, managed, configured, and/or altered by a network administrator via security environment 112 and controller 120.

As mentioned above, the security environment 112 may provide scrubbing or other security services for all traffic intended for the service device 106. In one particular implementation, traffic or other communication packets intended for service device 106 may be directed through security environment 112 such that the security features may be applied to the traffic. The redirecting of communication packets through the security environment 112 may be instigated through a BGP announcement or other routing protocol announcement. For example, the service device 106 may provide an IP address associated with the service device to the network 102 and other connected networks through one or more BGP announcements. The routing information announced by the service device 106 to network 102 may propagate through other components of the network through other BGP sessions, such as from gateway 110 to security environment 112, from security environment to gateway 108, and from gateway 108 to the end user device 104. This cascading route announcement from service device 106 through the security environment 112 creates a routing path by which traffic may be transmitted to service device 106 while providing scrubbing services on the traffic intended for the device. In another example, the network 102 may also learn about the dynamic address of the service device 106 through a DNS, APIs or another address resolver mechanism invoked by the gateway 110 and the 102 environment to determine where to send the traffic In general, the scrubbing devices 114-118 of the security environment 112 analyze communication packets to determine if such packets may be potentially malicious to a destination device, such as by being part of a DDOS attack, and remove or reroute such packets before reaching the service device 106. In this manner, a scrubbing of the communication packets for service device 106 may be provided through the scrubbing environment 112 to mitigate a DDOS attack on the destination device. The scrubbing devices 114-118 may be provided with or otherwise have access to scrubbing information that includes IP addresses associated with the service device 106, the type of scrubbing technique to apply to packets with the IP address, and other information that may configure the operation of the scrubbing devices to provide the scrubbing service. This information may be provided to the scrubbing controller 120 and/or scrubbers 114-118 for application to the traffic intended for service device 106 or other devices within or connected to network 102.

In order for the network 102 to locate the security environment 112 within the transmission path for the service device 106, the network 102 is often granted access to or control over the service device 106 providing the service. In most instances, the service device 106 may be instantiated within the network 102 such that routers, switches, and other devices of the network may be configured to route received traffic for the service device through the security environment 112. Because all traffic intended for the service device 106 in this instance arrives at the edge of the network 102 (such as at gateway 108), the network may control how the traffic is routed to the service device. In instances in which the service device 106 is instantiated outside of the network 102 and connected via an edge device (such as gateway 110), an administrator of the service device 106 may provide control over route announcements associated with the service device to the network 102. In other words, the service device 106 may be configured such that all routing to reach the device traverses through network 102 such that devices of the network may be configured to transmit the traffic through the security environment 112. In this manner, the network 102 is granted routing control over traffic intended for service device 106 to provide the scrubbing and other security services for the device.

Figure 2:
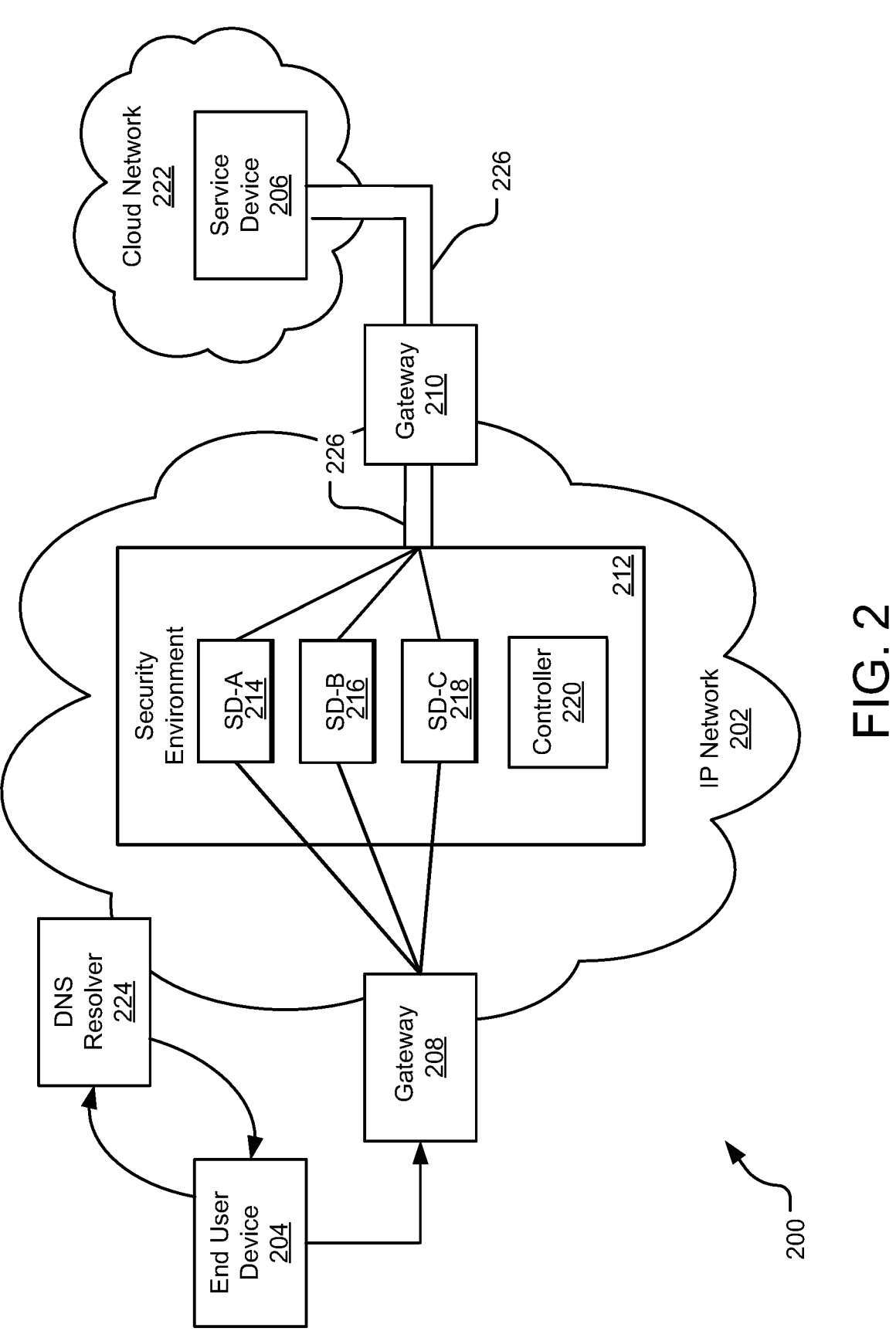
FIG. 2 is a schematic diagram illustrating an exemplary network environment operable to provide security services to devices instantiated on a public cloud environment, according to aspects of the present disclosure.

In some instances, however, the service device 106 is instantiated in a network in which control over routing to the device is not available to be controlled by the network 102. For example, FIG. 2 is a schematic diagram illustrating an exemplary network environment 200 operable to provide security features to service-providing devices instantiated on a public cloud environment, according to aspects of the present disclosure. Many of the components of the network environment 200 are similar to that described above with relation to the environment 100 of FIG. 1, such as the end user device 204 connected to network 202 through gateway 208 and service device 206 connected to the network through gateway 210. The network 202 may also include the security environment 212 as described above for scrubbing incoming traffic to service device 206 and/or applying other security features to traffic or requests to service device 206.

Although the service device 206 is illustrated in FIG. 2 as instantiated in cloud network 222, other network environments are also contemplated for use in relation to the environment 200 of FIG. 2, such as public networks, private networks, hybrid networks, and/or customer premise network environments. Generally, network environments control access to devices, services, workloads, etc. that are instantiated within their network. Thus, cloud network 222 may control access to service device 206, such as by assigning a network address to the service device upon instantiation of the device within the cloud network 222. The cloud network 222 may announce the assigned network address for the service device 206 to other networks (such as IP network 202) or devices in communication with the cloud network. In some instances, the assigned network address for service device 206 may be dynamically assigned such that multiple addresses may be assigned or associated with the service device over time. In other instances, the network address assigned to the service device 206 by cloud network 222 may be static. One particular example of a network address assigned or associated with the service device 206 is an IP address, although other network addressing schemes are contemplated.

Administrators of the service device 206 may desire to apply the security features available from IP network 202 to traffic intended to the service device instantiated within the cloud network 222. However, because network 202 does not control the routing announcements for service device 206, some traffic for the service device may not receive the security features. For example, end user device 204 may receive an announced route directly from cloud network 222 for communicating with service device 206 which may not include network 202 but may include another network. Requests to utilize the service device 206 generated by the end user device 204 may therefore be transmitted via other networks or devices directly to cloud network 222, bypassing network 202 and the security features available from network 202. One solution to the issue of bypassing the security features of the network 202 is to instruct the network 202 to announce the only available routing path to service device 206, thereby forcing traffic from end user device 204 through network 202. However, such announcements are typically limited to large blocks of contiguous IP addresses. Many service devices 206 or workloads instantiated in a cloud environment are not associated with such large blocks of IP addresses, particularly when IP addresses are dynamically assigned by the cloud network 222. Thus, for many service devices 206 in a cloud or other network environments, the security features provided by network 202 are not available for incoming traffic as much, if not all, of the incoming traffic is routed to the service device 206 via other networks or routes.

FIG. 3 is a flowchart illustrating a method for provide security services to devices or services deployed across various types of networks, according to aspects of the present disclosure. In one particular example, the method 300 of FIG. 3 may be performed to provide end-to-end security services for the service device 206 of FIG. 2 instantiated on cloud network 222 by redirecting or routing traffic for service device through network 202 and security environment 212. Although discussed herein with reference to end user device 204, it should be appreciated that the method 300 may apply to many end user devices requesting access to service device 206 of cloud network 222. In general, the operations of the method 300 may be performed by a device of network 202, such as controller 220 of security environment 212, among other devices. The operations may be executed by hardware components of a device of the network 202, execution of one or more software programs, or a combination of both hardware and software components of the network. Through the method 300, traffic from end user device 204 may be transmitted through the security environment 212 of network 202 such that security services, such as scrubbing of incoming traffic affected by a DDOS attack, may be applied to the incoming traffic, regardless of the network in which the service device 206 is instantiated.

Beginning in operation 302, the controller 220 may receive a network address, such as an IP address, that the cloud network 222 associates or assigns to the service device 206. For example, upon instantiating or inclusion in the cloud network 222, the service device 206 may be assigned an IP address by a device or other administration entity of the cloud network. As mentioned above, the service device 206 may include a virtual device instantiated on one or more devices of the cloud network 222. Thus, the network address associated with the service device 206 may be used to direct or transmit communications to the one or more devices of the cloud network 222 that are used to execute the workload of the service device. Further, the workload of the service device 206 may be migrated between devices of the cloud network 222 such that the network address associated with the service device may or may not be altered by the cloud network 222 while the service device is hosted on the cloud network. In some instances, the network 202 providing the requested security services for the service device 206 may not have control over the management and instantiation of the service device 206 within the cloud network 222 and/or the network address assigned or associated with the service device. Thus, as the service device 206 is instantiated or migrated between one or more devices of the cloud network 222, the network address assigned to the service device by the cloud network may be announced and received by the network 202. The cloud network 222 may internally route packets intended for the service device 206 to the device or devices upon which the service workload is instantiated. Thus, the address for the service device 206 may remain the same outside of the cloud network 222, but may be routed internally to any number of devices within the cloud network 222. In one particular example, cloud network 222 may announce, through a BGP session, an IP address associated with service device 206 to gateway 210, which may then propagate through network 202 such that the devices of the network can route communications intended for service device 206 to the edge of the cloud network 222. In another implementation, an administrator of the service device 206 may receive the associated network address from the cloud network 222 and provide the network address to the controller 220 or other devices of the network 202.

In operation 304, the controller 220 or other network devices may map the received network address for the service device 206 to one or more reserved IP addresses of a block of reserved IP addresses set aside by the network 202. More particularly, network 202 may include a block of IP addresses, in some cases a block of contiguous IP addresses, for use in providing the end-to-end security features to requested services of the network. The block of reserved IP addresses may include any number of addresses and may be reserved for use in providing the security features. Upon request from a service device 206 to receive the security features from the network 202, the controller 220 may assign one or more of the reserved IP addresses to the service device for this use. Upon receipt of the network address of the service device 206, the controller 220 may correlate the network address of the service device to one or more of the reserved IP addresses. This correlation may be stored by the controller 220 for use by the security environment 212 or other portions of the network 202. Mapping of other service device addresses to a reserved IP address of the block of reserved addresses may also be stored such that the network 202 may correlate each service device 206 receiving the security features to a reserved IP address that is associated with an announced address of the service device.

The controller 220 or network 202 may, in operation 306, update an associated Domain Name System (DNS) with the mapped block of reserved IP addresses. In particular, the DNS may include a resolver 224 configured to receive a hostname (such as a Uniform Resource Locator (URL)) from a requesting device and return an IP address associated with the provided URL. In general, end user devices, such as end user device 204, may enter a URL into a browser or other program executed on the end user device to request access to service device 206. The browser of the end user device 204 may provide the entered URL to the DNS resolver 224 to obtain an IP address at which the service device 206 may be reached. The resolver 224 includes correlated, or "resolved", URLs to IP addresses and returns the associated IP address to the requesting device. In this particular example, the DNS resolver 224 may initially correlate the network address of the service device 206 assigned by the cloud network 222 to the URL for reaching the service device. However, in operation 306, the network 202 may update the DNS resolver 224 with the mapped reserved IP address correlated with the network address of the service device 206 as assigned by the controller 220 above. In this manner, the reserved IP address of the network 202 may be the response provided by the DNS resolver 224 to the end user device 204 when provided with the URL for accessing the service device 206.

In addition, the network 202 may advertise, such as through a BGP announcement, the block of reserved IP addresses to other networks and devices connected or in communication with network 202, in operation 308. For example, gateway 208 of network 202 may advertise the block of reserved IP addresses to end user device 204 such that the end user device may route communications with a destination address of one of the announced reserved IP addresses to the network 202. Because the network 202 may own or otherwise be assigned the block of reserved IP addresses, all traffic transmitted to one of the reserved addresses may arrive at the network 202 for connection to a destination device. In one particular implementation, the network 202 may also associate the block of reserved IP addresses with one or more devices of the security environment 212 such that, when a communication is received at the network 202 with a destination address that matches one of the reserved IP addresses, the network 202 may internally route the communication to the security environment 212 for application of one or more security features to the received communication.

In some instances, the block of reserved IP addresses may include Anycast IP addresses such that end user device 104 may be routed to a security environment 212 of the network 202 that is closest, either geographically or logically, to the end user device. In Anycast routing, many different devices of a network 202 may announce the same IP address (e.g., 1.2.3.4) to which packets may be addressed for transmission. In other words, multiple devices within a network 202 may advertise the same Anycast address such that packets with the Anycast address (as the destination address) may be transmitted to any of the multiple devices. The decision on which of the multiple devices to which the packet is sent is left to other routing devices of the network 202, such as by determining which of the multiple devices is geographically closest to the transmitting device. In regards to the security environment 212, the network 202 may include several instances of the security environment distributed throughout the network to provide security services to services in multiple locations. For example, the network 202 may include a first security environment located in and for services in North America and a second security environment located in and for services in South America. The distribution of the security environments 212 within the network 202 may be controlled and managed by an administrator of the network and may be based on any business, geographic, network infrastructure, or any other considerations. When end user device 204 transmits a communication packet to the network 202 using the Anycast address, routing devices within the network may route the communication to the nearest (in terms of geography and/or network routing logic) security environment 212 to the end user device. In this manner, Anycast addressing may be used by the security environments 212 of the network 202.

In operation 310, the network 202, and in particular the security environment 212, may receive a request for access to the service device 206 instantiated in the cloud network 222. The request may be received at the security environment 212 utilizing the reserved IP address mapped to the service device 206 by the network 202. For example, the end user device 204 may attempt to access service device 206 or request a service from service device by providing a URL associated with the service device to the DNS resolver 224. After being updated with the reserved IP address for that device, the resolver 224 may return the correlated reserved IP address for the security environment 212 to the end user device 204 in response to the DNS request. The end user device 204 may, in turn, transmit a request for services from the service device 206 using the reserved IP address such that the request is routed to network 202 via gateway 208 and to the security environment 212. The security environment 212 may apply one or more security features to the received request, such as DDOS protection through scrubbing, firewall protection, and other network security features. In a similar manner, other requests, communications, packets, etc. intended for service device 206 may be redirected to security environment 212 for application of security features to the incoming traffic.

Once the security features have been applied to the incoming traffic, the network 202 may transmit the received traffic to the service device 206 for fulfillment of requests, communications, access, etc. transmitted from the end user device 204. To maintain the security of the "cleaned" traffic, a secure communication tunnel 226 may be established between the security environment 212 and the service device 206 in operation 312. In general, a secure communication tunnel is a communications protocol that allows for transmission of data from a source device to a destination device through an encapsulation technique. Some secure tunnels may include encryption of the data to prevent a third party from accessing the data during transmission through the secure tunnel. In one particular implementation, the secure communication tunnel 226 may be a GRE tunnel, although any secure communication tunnel between the security environment 212 and the service device 206 may be established or instantiated using a different tunneling technique. Such techniques may or may not include an encryption of the data. In some instances, the secure tunnel 226 may originate at the security environment 212, include the gateway 210, and terminate at the edge of the cloud network 222.

To generate the tunnel to the service device 206 or the cloud network 222, the network 202 may access the stored network address assigned to the service device 206 and provided to the network above to determine a destination, or end, of the secure tunnel. Further, the network 202 may be aware of the network address based on the reserved IP address from which the request was received and the stored mapping information. For example, the end user device 204 transmits the request to access service device 206 using the reserved IP address as the destination address of the request. The controller 220 may access the stored mapping information and correlate the destination address included in the request to the network address associated with the service device 206. The correlated network address of the service device 206 based on the stored mapping information may be used to generate the secure communication tunnel 226 to the service device 206 and/or cloud network 222. With the destination address for the service device 206 known, the network 202 may establish the secure tunnel originating at the security environment 212 and terminating at the edge of the cloud network 222 or the service device 206 itself.

In instances in which the cloud network 222 dynamically assigns the network address to service device 206, the termination of the secure communication tunnel 226 may similarly be dynamic. For example, security environment 212 may continually update the stored mapping information with newly received network addresses assigned to service devices 206 of the cloud network 222 such that the secure communication tunnel 226 may be terminated at the service device. In this manner, generation of the secure communication tunnel 226 may be similarly dynamic to respond to a dynamically assigned network address for service device 206.

In addition, the network 202 may provide an origination IP address of the secure communication tunnel 226 to the cloud network 222 in operation 314 for inclusion in a firewall or other security feature offered by cloud network 222. In particular, the cloud network 222 may include its own security features for workloads, virtual devices, physical devices, etc. instantiated within the cloud network. Such security features may include a firewall feature that denies communication packets based on origination IP addresses included in a header of the packet, among other security features. The security environment 212 may include one or more origination IP addresses for transmitting communications to the cloud network 222 via the secure communication tunnel 226 to the cloud network 222 and, in response, the cloud network may include the provided origination IP addresses into a permit list of allowed IP addresses. In other words, the security environment 212 and/or network 202 may seed the origination IP address of the secure communication tunnel 226 to the cloud network 222 so that the cloud network may allow the secure communications to pass into the network to the destination device unimpeded by the firewall service. In operation 316, the security environment 212 may transmit the scrubbed traffic to the service device 206 via the established secure communication tunnel 226. The service device 206 may respond to the request from the end user device 204 through an alternate path back to the end user device 204 or may respond through network 202 to provide the requested service to the end user device. Through the systems and methods described above, one or more security features offered by network 202 may be applied to traffic intended for service device 206 instantiated on cloud network 222 (or other types of networks) to provide end-to-end security service over multiple network types.

Figure 4:
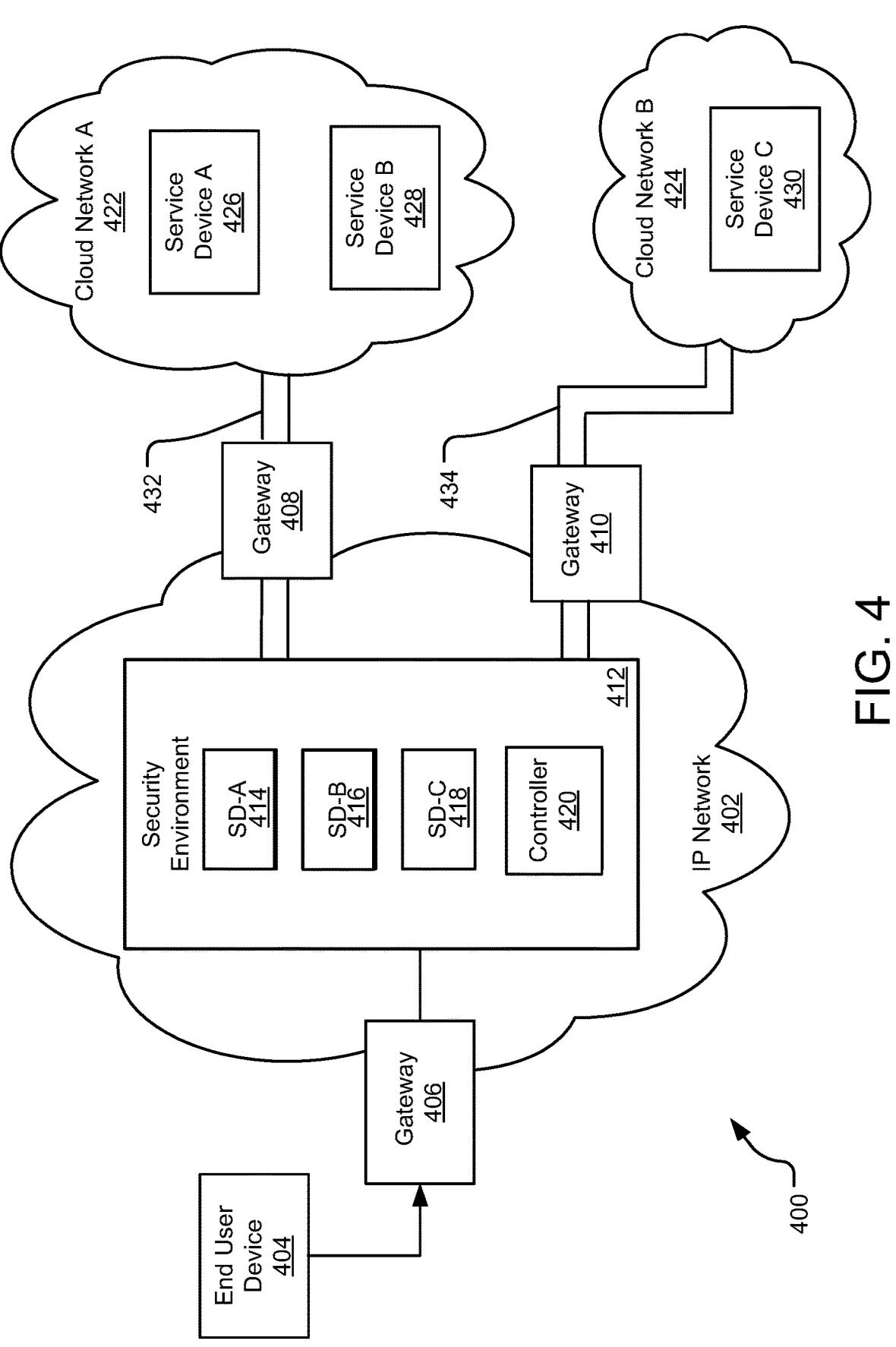
FIG. 4 is a schematic diagram illustrating an exemplary network environment operable to select devices instantiated on one or more public cloud environments to receive security services, according to aspects of the present disclosure.

To improve the efficiency of providing the end-to-end security features, one or more configurations of the network environment 200 for providing security services to service devices 206 in a cloud network 222 may be based on an analysis and/or modeling of the network by the controller 220 or other orchestrator device of the network 202. In particular, FIG. 4 is a schematic diagram illustrating an exemplary network environment 400 operable to select from among multiple devices 426-430 instantiated on one or more cloud environments 422, 424 to receive security services, according to aspects of the present disclosure. As explained in greater detail below, one or more machine learning or artificial intelligence techniques may be executed by a device of the network 402 to select a device, service, and/or workload to receive the security services discussed above.

Many components of the network environment 400 of FIG. 4 are similar to that discussed above in relation to FIG. 2. For example, the network environment 400 may include IP network 402, with gateway devices 406-410 and security environment 412 with one or more scrubbers 414-418 and a controller 420. End user device 404 may connect to the IP network 402 to request and receive services or otherwise communicate with a service device. As before, a service device 426 may be instantiated in a cloud environment, such as cloud network A 422. In the instance illustrated in FIG. 4, a plurality of service devices 426-430 may be instantiated in various networking environments 422, 424. In the particular illustrated example, service device A 426 and service device B 428 may be instantiated within cloud network A 422 and service device C 430 may be instantiated in cloud network B 424. In general, the service devices 426-430 may provide the same or different services to end user devices requesting services from the devices, such as end user device 404. Cloud network A 422 may be maintained and/or managed by a first entity and cloud network B 424 may be maintained and/or managed by a different entity. Further, the cloud environments 422, 424 may differ in technical aspects, such as services offered to instantiated devices or workloads, communications schemes, geographic footprint, and the like. In one particular example, cloud network A 422 may be a public cloud environment and cloud network B 424 may be a private cloud environment, although other types of network environments are contemplated for use with the embodiments described herein.

As described above, end user device 404 may request connection to a service device, such as service device A 426, to receive services offered from the service device. Through redirection, traffic intended for service device A 426 may be redirected through network 402 and security environment 412. Further, a secure communication tunnel 432 may be established between the security environment 412 and cloud network A 422 or service device A 426 for the clean traffic. In some instances, the controller 420 of the security environment 412 may include applications, programs, instructions, and the like to obtain data from the service devices 426-430 and analyze such data performance metrics of the network 402 and/or service traffic, business metrics associated with a service to the network, and/or contractual metrics associated with the service and generate a system model utilizing machine learning and/or artificial intelligence techniques. Through this analysis, the controller 420 may select a service device 426-430 from the available service devices for providing services to the end user device 404 or otherwise determine to which destination device service traffic should be routed. In another example, the analysis may determine a computing environment in which the security environment 412 is instantiated to provide the security services to a one or more service devices. Security environment 412 may, in some instances, include an API through which any of service device 426-430 may perform a create, read, update, or delete function to any other service device. In this manner, the configuration of the network environment 400 for providing the security services to service devices 426-430 instantiated on various networks may be altered or otherwise based on measured network performance data that may also include application response performance data to optimize or improve providing the security services to the service devices.

In the particular example illustrated in FIG. 4, service device A 426 and service device B 428 may be instantiated within cloud network A 422 and service device C 430 may be instantiated in cloud network B 424. Each service device 426-430 may be configured to provide the same services or workloads to requesting end user devices 404 such that the particular service device instance to which an end user device is connected may not alter the type of services received by the end user device. However, due to varying parameters of the cloud networks 422, 424, providing the service to the end user device 404 may vary in cost to the service provider. In the manner described above, traffic intended for the service devices 426-430 may be rerouted through security environment 412 for scrubbing or application of other security services. However, when multiple service devices 426-430 are instantiated in one or more other networks, the controller 420 may select the service device to which the traffic from end user device 404 is transmitted. In other words, traffic may be routed to service device A 426 or service device B 428 of cloud network A 422 or service device C 430 of cloud network B 424. To select the service device 426-430 to transmit the receive traffic, controller 420 may execute the method 500 illustrated in FIG. 5. In particular, FIG. 5 is a flowchart illustrating a method 500 for utilizing network data performance metrics, application response performance data, and other network information to provide security services to devices deployed across various types of networks, according to aspects of the present disclosure. The operations of the method 500 may be executed through one or more hardware components, one or more software programs, or a combination of both hardware and software components of a computing device or computing devices of network 402, such as controller 420 although other devices of the network may also perform one or more of the operations of the method 500.

Beginning in operation 502, the controller 420 or other component associated with network 402 may collect service parameters or other data associated with providing the requested security service to the service devices 426-430. For example, an administrator of the service devices 426-430 may enter into an agreement or otherwise agree with an operator of the network 402 to provide the security services to traffic intended for the service devices. Such agreements, also known as service level agreements (SLA), may include performance parameters for providing the service to the service devices 426-430, such as security requirements for transmitting the service traffic, data handling requirements (such as a minimum and/or maximum bandwidth and/or transmission speed), data governance requirements, storage availability, caching requirements of traffic, redundancy requirements or other loss mitigation techniques, and the like. The service parameters collected may also include technical specifications of any cloud networks or other network environments in which service devices are instantiated. For example, cloud network A 422 may include some or all of the same performance parameters as described above for routing traffic to service device A 426 and/or service device B 428. Cloud network B 424 may include different technical aspects or parameters for routing traffic to service device C 430. In general, the collected service parameters may define any performance requirements, including both maximum performance data thresholds and minimum performance data thresholds, for providing one or more security services to traffic intended for the service devices 426-430 collected from network 402, cloud network A 422, cloud network B 424, or any other network in which an instance of a service device is instantiated for which the security service is requested.

In operation 504, the controller 420 may generate a model of a portion or all of the network environment 400 to determine one or more performance thresholds for providing the security service to the service devices 426-430. For example, given network infrastructure, technical capacities of the network devices, network 402 capacities, established routes of the network, technical capabilities and/or limitations of the cloud networks 422, 424, etc., the controller 420 may generate a model of the flow of traffic through the security environment 412 and to the service devices 426-430. Based on the technical aspects of the various devices and networks involved in transmitting communications to the service devices 426-430, the model may indicate some service devices as receiving scrubbed or cleaned traffic faster than other service devices. For example, service device A 426 may be geographically closer to network 402 such that traffic transmitted to service device A may arrive at the device before traffic transmitted to a service device located further away, such as service device C 430. In some instances, service device A 426 may be geographically closer to security environment 412 and/or end user device 404 than service device B 428, even though both are instantiated with the same cloud network 422, which may be captured in the network model generated by the controller 420 or other network device. Further, cloud network A 422 may have a SLA that ensures a faster transmission speed within the cloud network to reach service device A 426 than cloud network B 424 may provide to traffic intended for service device C 430 such that traffic sent to service device A from security environment 412 may arrive faster than traffic sent to service device C. In another example, cloud network B 424 may provide more security features to mitigate or prevent traffic loss to service device C 430 than cloud network A 422 provides to service device A 426 or service device B 428. In general, the model of the network environment 400 may include some or all of the technical aspects collected above for the IP network 402 and the connecting networks 422, 424 in which a service device associated with an SLA is instantiated.

With the network environment model, the controller 420 may execute one or more simulations on the environment model to determine one or more performance characteristics for providing the security service to the service devices 426-430 of the varied networks. In particular, simulations may be executed on the generated model to determine particular technical limitations or other parameters for transmitting service traffic via the secure tunnels 432, 434 to the cloud environments 422, 424 or service devices 426-430. For example, the simulation may provide a maximum transmission speed to reach service device A 426, an expected packet loss to reach service device B 428, an available bandwidth for traffic to service device C 430, and the like. In general, any network environment performance metric may be determined via the simulation executed on the network model.

The controller 420 may, in operation 506, determine if the output of the simulation on the model indicates a change to the security system configuration and, more particularly, in selecting a route for providing the traffic to a service device 426-430. As mentioned above, each of the service devices 426-430 instantiated in the various networks 422, 424 may provide the same service to end user device 404 such that traffic intended for one particular service device may be rerouted to another service device to provide the same service. Thus, whether the traffic from end user device 404 is transmitted to service device A 426, service device B 428, or service device C 430 may not matter to the end user device and may instead be based on routing decisions made by security environment 412 or other network devices of network 402. Such routing decisions may be constrained, however, by the service parameters for providing the security service discussed above. For example, the controller 420 may determine, based on the simulation, that providing traffic to cloud network B 424 may exceed a performance threshold of the service parameters, such as lacking required loss prevention or exceeding a lag threshold, whereas providing traffic to cloud network A 422 does not exceed the performance thresholds. Based on this determination that one or more performance thresholds may be exceeded by a network environment configuration, the controller 420 may determine that the configuration of the network should be changed or altered. Continuing the example above, the security environment 412 may have a current configuration to transmit traffic from end user device 404 to service device C 430 of cloud network B 424. A secure communication tunnel 434 may then be established or used if already established between the security environment 412 and service device C 430, as explained above. However, because the simulation on the network model indicates that transmission of traffic along secure communication tunnel 434 may exceed one or more performance thresholds (such as minimum time for transmission, packet loss, etc.), the controller 420 may then determine that an alteration to the security environment 412 and/or network 402 to transmit packets from the end user device 404 to an alternate service device 426, 428 may be established. For example, the simulation may indicate that a secure communication tunnel 432 to service device A 426 or service device B 428 of cloud network A 422 may not exceed the performance thresholds such that altering the path to a service device hosted by cloud network A 422 may be necessitated.

If the controller 420 determines that a current configuration of the security environment 412 or network 402 exceeds one or more of the performance thresholds based on the simulation executed on the modeled network, an alteration to the configuration may be applied in operation 508. For example, the security environment 412 may generate or establish secure communication tunnel 432 to cloud network A 422 to begin providing traffic to service device A 426 or service device B 428. As explained above, the security environment 412 may obtain a network address for service device A 426 or service device B 428 from a DNS or other look-up table associated with cloud network A 422. The network address may be either a static network address or a dynamically assigned network address. Upon establishing the communication tunnel 432, the security environment 412 may begin transmitting traffic from end user device 404 intended for a service device to cloud network A 422 via the communication tunnel 432. In this manner, the configuration of the security environment 412 for providing security features to the service traffic may be adjusted based on the network model and/or a simulation executed on the network model.

If the controller 420 determines, in operation 506, that the current configuration of the security environment 412 or network 402 does not exceed a performance threshold, the controller 420 may begin collecting data performance metrics of the network and/or security environment over time in operation 510. For example, while providing the security features to the traffic for the service devices 426-430, the controller 420 or other network device may gather performance metrics, such as transmission times, packet loss, available bandwidth, processing speed, amount of traffic, and the like. The performance metrics may also include one or more business-related metrics that may or may not be received from an administrator of the service devices or various networks, such as cost of deployment of the service devices 426-430 within particular network environments, cost of transmission of packets through the network environments, location (both geographical and/or logical) of deployed service devices within the network environments, available capacity for traffic or deployed workloads or devices for the various network environments, and other costs for hosting the service devices in the network environments. Such performance information may be obtained over a period of time such that the metrics may be a time-series of performance data. In some instances, one or more performance metrics may be received from the network environments hosting the service devices 426-430. For example, cloud network A 422 may provide performance metrics for traffic routed to the service device A 426 and/or service device B 428 over the period of time. The received performance metrics may be combined or otherwise associated with the performance metrics of network 402 to capture an overall performance of the network environment 400 over the period of time.

In some instances, changes over the period of time the performance metrics are measured may also be tracked. For example, costs to transmit traffic through the cloud environments 422, 424 may fluctuate based on time of day or available capacity within the respective networks. The adjustments to the costs for utilizing the networks 422, 424 may be tracked within the performance metrics and considered when modeling the network environment 400. For example, the performance metrics may determine that the costs associated with traffic sent to cloud network A 422 may be highest from the hours of 2:00 pm to 5:00 pm, Monday through Friday while the costs associated with traffic sent to cloud network B 424 may be highest from the hours of 9:00 am to noon on traditional workdays. Similarly, the available bandwidth or transmission speed associated with the network environments 422, 424 may be tracked over the period of time, as well as performance metrics for network 402. The period of time over which the performance metrics are obtained or otherwise tracked may be any period of time, such as one hour, 24 hours, a week, a month, etc.

The controller 420 may, in operation 512, adjust the model of network system performance based on the obtained performance metrics. For example, the system model may be adjusted to account for the variation in performance metrics obtained over the period of time to obtain an updated model of a current condition of the security environment 412 or network 402. For example, congestion may be detected at cloud network A 422 at particular times over the monitored period of time or during the entire duration of the period of time. This measured congestion in the cloud network 422 may significantly slow transmission speed of traffic through the cloud environment. In response, the model of the network performance may be adjusted to account for the measured congestion. In another example, a service device 428 may be decommissioned and re-instantiated within cloud network A 422 based on one or more configuration rules of the cloud network. The geographic and/or logical location of the re-instantiated service device 428 within the cloud network 422 may be observed during the monitoring period and the system model may be adjusted to account for the change in service device location. In still another example, a cloud network SLA with the administrator of the service devices 426-430 may be updated or altered and such alterations may be provided to the controller 420 for inclusion in the network environment model. In general, any changes to the system performance data, compute performance data, network performance data, business-related metrics, contractual metrics, and the like may be obtained and used to alter the network environment model for modeling the behavior of the security environment 412 and network 402.

In some instances, the adjustment to the security environment model may provide for predictive performance metrics of the operation of the security environment in the future. For example, the model may provide a predictive performance of the system at some point in the future based on a simulation executed on the model for a particular time, day of the week, day of the month, etc. The predictive metrics may aid the controller 420 in planning future configurations of the security environment 412 or for obtaining predicted environment operations to select a future configuration of the security environment and optionally informing the commercial terms, such as the Service Level Agreement (SLA) of the security service offered via the security environment 412.

Upon adjusting the model in operation 512, the controller 420 may return to operation 506 to determine if an output of a simulation on the model indicates a change in the configuration of the security environment 412 and/or network 402. In other words, the adjustment to the network model based on the performance metrics obtained over time may fine-tune the model to provide a more accurate simulation of the network and security environment conditions. In some instances, the adjusted model may include adjusted performance thresholds to increase the efficiency, lower the cost, improve the performance, and the like of providing the security services to the service devices 426-430. The adjusted model may therefore provide or indicate a configuration that improves one or more performance metrics of the security environment 412 and the controller 420, in response, may alter the configuration of the security environment (such as instantiated a secure communication tunnel to a selected cloud network or service device). Additional obtaining of performance metrics over future periods of time may further refine the model to continue improving the configuration of the security environment 412.

Although described above in relation to selecting among a plurality of service devices 426-430, the above method 500 may also be used for other configurations of the security environment 412. For example, the security environment 412 may be instantiated in any number of available networks, such as cloud network A 422 and/or cloud network B 424. The network in which the security environment 412 is instantiated may be determined through the modeling and simulation processes described above. In particular, the generated model may simulate instantiating the security environment in any available network and obtain the performance metrics of the modeled system. From the obtained performance metrics, the network 402 or other computing device may determine to instantiate the security environment in one or more of the available networks. Such performance metrics may include the cost of instantiating the security environment in a particular network, the performance of the instantiated security environment, the location of the security environment in relation to a target or destination service device, and the like.

Figure 6:
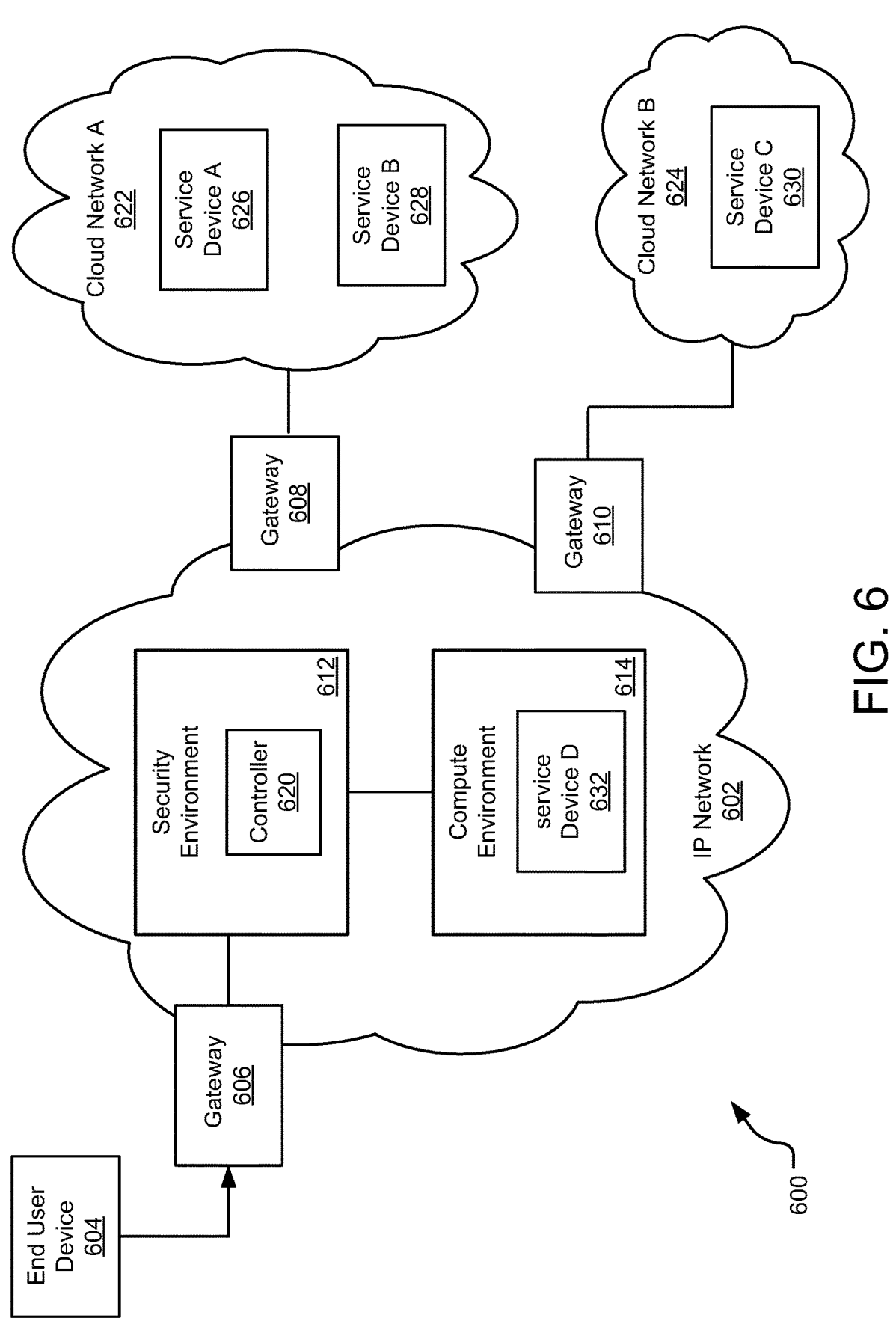
FIG. 6 is a schematic diagram illustrating an exemplary network environment operable to instantiate a service device in a compute environment of a network based on network data performance metrics, according to aspects of the present disclosure.

In still another implementation, the above method 500 may be utilized to instantiate an additional service device, such as within network 402. In particular, FIG. 6 is a schematic diagram illustrating an exemplary network environment 600 operable to instantiate a service device 632 in a compute environment 614 of a network 602 based on network data performance metrics, according to aspects of the present disclosure. The components of the network environment 600 of FIG. 6 may be the same or similar to those components described above with relation to FIG. 4 and similar component may have similar numerical identifiers. In this instance, however, the modeling and simulation of the network environment 600 described above may indicate that providing traffic to any of service devices 626-630 may exceed one or more performance thresholds, such as cost to transmit, transmission speed, packet loss, etc. The controller 620 of the security environment 612, or other network device of network 602, may therefore determine to instantiate a new service device or workload, labeled service device D 632, in a compute environment 614 of the network 602. In general, service device D 632 may provide the same or similar features as service to devices 626-630 for end user device 604 upon a request from the end user device. However, because the administrator of the security environment 612 may be the same or a related entity as the administrator of the network 602, a new service device 632 may be instantiated within network 602 to respond to requests received from end user device 604.

To instantiate service device D 632, the controller 620 may access or otherwise communicate with one or more components of a compute environment 614 of the network 602 and request instantiation of the service device 632. Technical specifications for instantiating the service device 632 may be known by or communicated to the compute environment 614 by devices of the network 602 (such as controller 620) or from other sources (such as an administrator of the service devices). Instantiation of the service device 632 may include requesting and reserving components and/or services of the compute environment for hosting the service device workload, such as an application server, a database, processing devices, and the like. Technical aspects, service parameters, business-related information, etc. of the compute environment 614 may also be collected by the controller 620 in a similar manner as described above in relation to cloud networks 622, 624. In this manner, the controller 620 may include the compute environment 614 of network 602 as another network environment in which service devices may be instantiated. If the network model and simulation of providing service traffic indicates that instantiating a service device 632 in the compute environment satisfies the performance thresholds, the controller 620 may begin the process of instantiating the service device in the compute environment. Following instantiation of the service device 632, the security environment 612 may be configured to route service traffic to the service device 632 at the compute environment. In some instances, routing of the service traffic to the compute environment 614 may include establishing a secure communication tunnel through network 602 between security environment 612 and compute environment 614. In a similar manner, the model and simulation may indicate instantiating a service device in any available network environment to meet the performance thresholds for providing the security service to the devices or workloads associated with the service.

As mentioned above, the network environments may assign either static or dynamic network addresses for instantiated service devices. Or in other instances, the service devices may be migrated from one network to another based on the model/simulation analysis discussed above. To connect to or otherwise provide traffic from the security environment to any statically or dynamically address service device instance or newly migrated service device instance, an identification of the endpoint at the service device or hosting network for a corresponding secured communication tunnel may be determined. In one implementation, the network may utilize a Route Named Service (RNS) to determine and/or manage the endpoints for establishing secured communication tunnels through the network to one or more service devices associated with the security environment.

Figure 7:
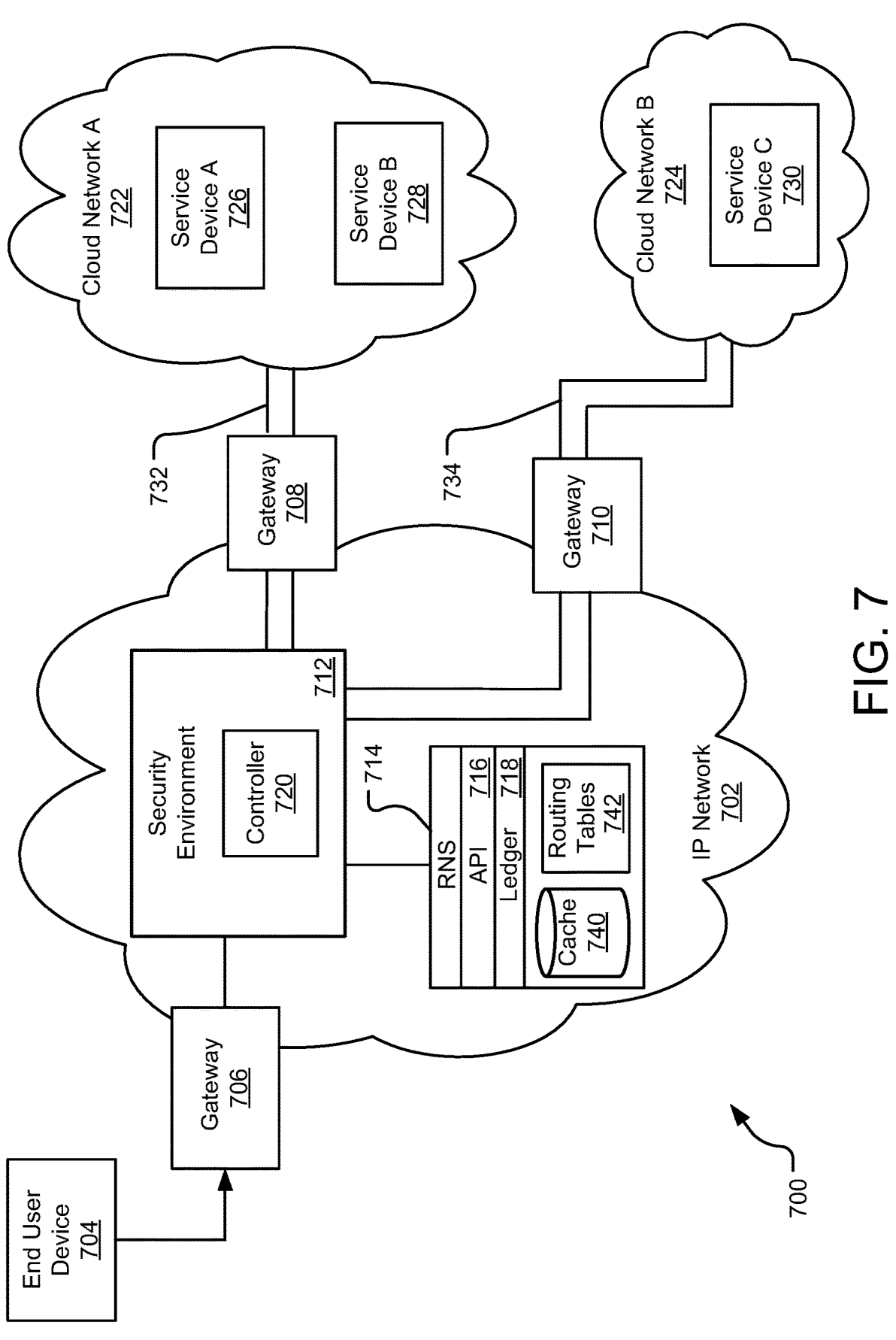
FIG. 7 is a schematic diagram illustrating an exemplary network environment operable to dynamically configure communication tunnels to workloads instantiated on one or more public cloud environments, according to aspects of the present disclosure.

FIG. 7 is a schematic diagram illustrating an exemplary network environment 700 operable to dynamically configure communication tunnels to workloads instantiated on one or more public cloud environments, according to aspects of the present disclosure. As above, the network environment 700 may include several of the components previously described for providing a security service to an end user device 704, such as IP network 702, with gateway devices 706-710 and security environment 712 for providing security services to traffic intended for one or more service devices 726-730 instantiated in one or more network environments 722, 724. The security environment 712 may include controller 720 to perform one or more of the operations or methods described herein, although other components of the network may also perform the described operations. As also discussed above, security environment 712 may establish one or more secure communication tunnels 732 to provide secured traffic to service devices 726 and/or 728 of cloud network A 722 and secure communication tunnel 734 to communicate with service device C 730 of cloud network B 724. In this implementation, however, the network 702 may include a Route Named Service (RNS) device 714 to aid in establishing, selecting, or otherwise managing secure communication tunnels 732, 734 to the service devices 726-730.

In one particular implementation, the RNS 714 may store and manage destination network addresses for the service devices 726-730 receiving or otherwise associated with a security service provided by the security environment 712.

For example, the RNS 714 may store device names, service names, URLs, etc. associated with a workload or service provided by the service devices 726-730 and correlate those names to one or more network addresses assigned to or otherwise associated with the service devices. As explained above, a network environment on which a service device is instantiated may assign or provide a network address at which the service device may be reached by requesting devices. For example, cloud network A 722 may assign a first network address, such as an IP address, to service device A 726 and a second network address to service device B 728. Communication packets intended for the service devices 726, 728 may include the network address in a "destination address" field of a header portion of the packet. Routing devices within the networks may obtain the destination network address from the header and route the packets accordingly to terminate at one or more of the service devices 726-730. In some instances, both service device A 726 and service device B 728 may be assigned the same network address by cloud network A 722 such that traffic received at the cloud edge may be routed to either service device A or service device B by the cloud network based on routing rules established and executed by the cloud network. In a similar manner, cloud network B 724 may assign a network address to service device C 730 for routing communications to the service device. As explained above, these network address assigned to the service devices 726-730 may be dynamically learned and announced, perhaps via APIs or DNS information published or provided by cloud networks or a BGP announcement session to network 702 and propagated through the devices of the network, including RNS 714 and security environment 712.

The security environment 712, the controller 720, or any other orchestrating device of the network 702 may utilize the announced network addresses for the service devices 726-730 to establish the secure communication tunnels 732, 734 to those devices. For example, the security environment 712 may use the network address of service device A 726 as an endpoint for secure communication tunnel 732 to provide secured communications to the service device. However, some network environments may assign network addresses in a dynamic manner such that the assigned address may change based on operating conditions within the network. A change in the network address assigned to service device 726-730 may require establishing a new secure communication tunnel to the newly assigned network address to properly reach the target service device. In another example, the security environment 712 may, based on the modeling and simulation techniques described above, determine to migrate services from one service device to another or instantiate a new service device on another network or compute environment. Migration or instantiation of a new service device or workload may include establishing a secure communication tunnel to a new endpoint network address. In such circumstances, the RNS 714 may aid the security environment 712 in determining or selecting the endpoint network address to which a secure communication tunnel may be established.

Among other functions, the RNS 714 may include one or more Application Programming Interfaces (APIs) 716 for communicating with one or more devices, systems, and/or networks of network environment 700, one or more digital ledgers 718 for tracking changes to the secure communication tunnels generated from security environment 712 or any newly instantiated or migrated service devices, a cache 740 or other storage for storing received service device information (such as past and current network addresses for the service devices), and one or more routing tables 742 maintaining correlations between device or system names and network addresses associated with the service devices 726-730. It should be appreciated that more or fewer components of the RNS 714 may be present and the layers or components illustrated in FIG. 7 are for example only and should not be considered limiting. The operations of the various components of the RNS 714 are described in more detail below.

Figure 8:
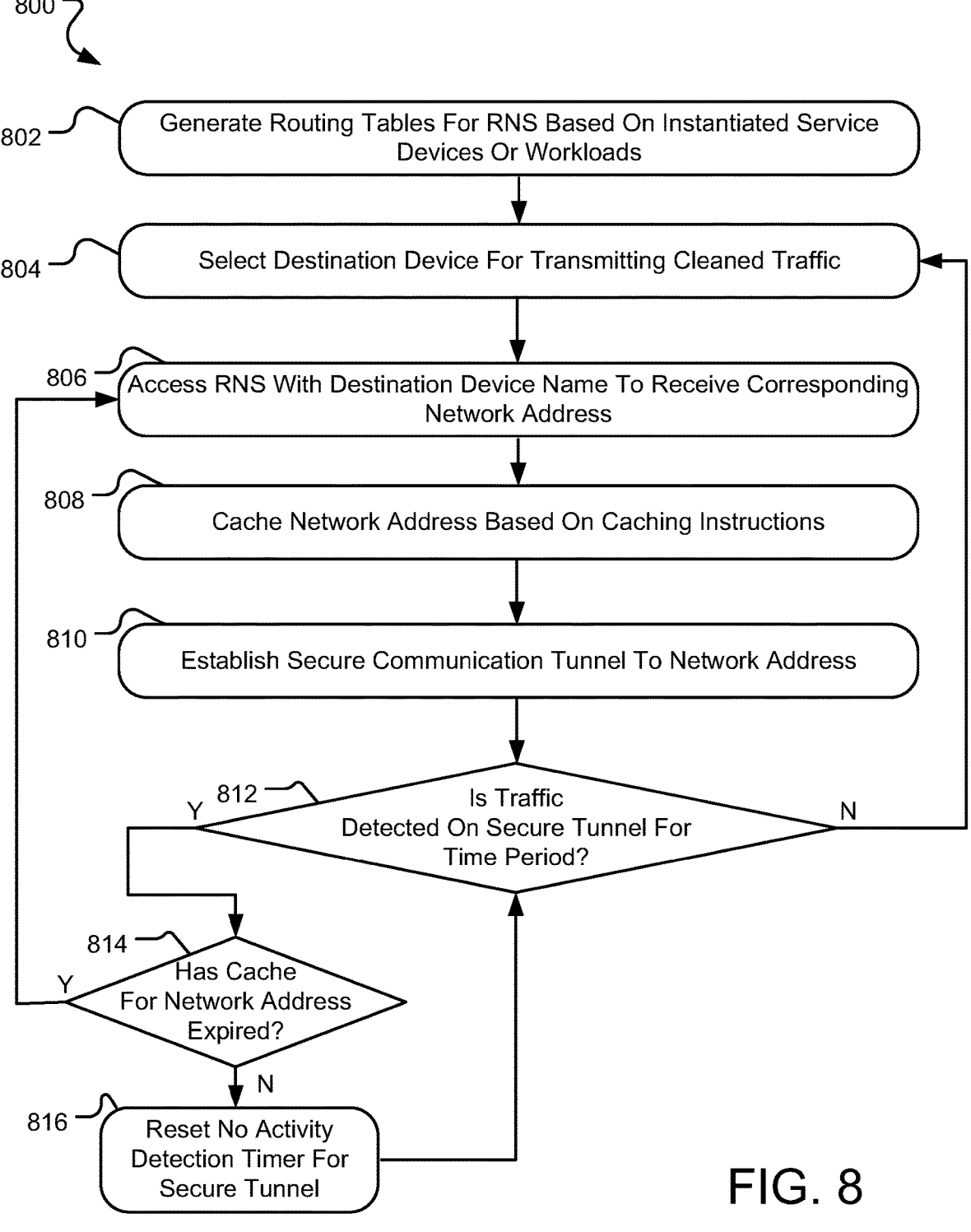
FIG. 8 is a flowchart illustrating a method for dynamically configuring communication tunnels to workloads instantiated on one or more public cloud environments using a Route Named Service, according to aspects of the present disclosure.

FIG. 8 illustrates one method 800 for dynamically configuring communication tunnels 732, 734 to workloads instantiated on one or more public cloud environments 722, 724 using a RNS 714, according to aspects of the present disclosure. In one instance, the operations of the method 800 may be performed or executed by the controller 720 of the security environment 712, although any device of the network 702 or associated with the network may perform the operations of method. Further, the operations may be performed by one or more hardware components of devices of the network 702, one or more software programs associated with the network, or a combination of both hardware and software components. Through the method 800, the security environment 712 and/or the network 702 may establish one or more secure communication tunnels to one or more service devices 726-730 as part of providing a requested service to end user device 704.

Beginning in operation 802, the controller 720 may generate one or more routing tables for the RNS 714 based on the service devices 726-730 or workloads instantiated in the various networks 722, 724 in communication with network 702. In general, the RNS 714 may operate as a Named Directory or other device for associating a name of a device of the network environment 700 to a network address, such as an IP address or other type of network address. As mentioned above, a cloud network 722 or any other type of cloud on which service devices may be instantiated may assign network addresses to the instantiated devices. The assignment of the network address to a particular service device may occur upon instantiation or at any other time in the life cycle of the instantiated service device. Further, the cloud network 722 may announce the assigned network addresses to other networks, such as network 702 for population of routing tables of devices within the network. The RNS 714 may receive such network address information and store such information in cache 740 or other storage device. In addition, the RNS 714 or security environment may associate a device name with the received network address. For example, service devices 726-730 may be associated with a particular client or service identifier by the network 702. In some instances, the service identifier may include a URL or other alphanumeric name that is used by the network 702 to identify the service devices 726-730. The service identifier may be provided by the service devices 726-730, an administrator of the service devices, the cloud networks 722, 724 within which the service devices are instantiated, or the network 702 to track the traffic processed for the service devices. In the example in which the security environment 712 controls or orders the instantiation of a service device, the environment may request and receive, from the selected network, a network address for the instantiated device and associate the received network address with a device or service identifier. This association of network address to service or device identifier may be stored in the routing tables 742 of the RNS 714 such that a mapping of network addresses to service or device identifier is maintained by the RNS. The information stored in the routing tables 742 and/or the cache 740 may be updated as new devices are instantiated or selected, as described in more detail below with reference to the method 900 of FIG. 9.

In operation 804, the controller 720 may select a destination service device for transmitting "cleaned" traffic or traffic intended for a service device 726-730 that has had one or more security features applied to the traffic. For example, the controller 720 may select to provide the traffic to service device A 726 of cloud network A 722. Such decision may be based on many factors, such as an instruction from the service device, a simulation of providing the traffic on a model of the network environment 700, one or more performance thresholds or parameters, one or more business decisions (such as costs and network capacity), and the like. Once selected, the controller 720 may access the RNS 714 with a destination device or service identifier to receive a network address associated with the selected destination device in operation 806. For example, assume the controller 720 selects service device A 726 to provide traffic from end user device 704 based on a proximity of service device A to a location of end user device. The controller 720 may provide a service identifier, such as a URL associated with an administrator of service device A 726 or an identifier of the service provided by the service device, to the RNS 714. In one instance, the controller 720 may utilize the API 716 of the RNS 714 to provide the service identifier to the RNS. In response, the RNS 714 may apply the received service identifier to the routing tables 742 to find an associated network address for service device A 726. As discussed above, the network address assigned to service device A 726 may be provided by cloud network A 722 to network 702 for storage and reference. Through the correlation in the routing tables 742, the RNS 714 may obtain the network address assigned to service device A 726 and provide the network address to the controller 720. In one instance, the RNS 714 may also use the API 716 layer to communicate the network address to the controller 720. Also, more than one network address may be returned in response to a service or device identifier. For example, the RNS 714 may provide three ranked network addresses associated with the service identifier. The controller 720 may include routing logic to select one of the multiple network addresses returned to the controller by the RNS 714 to determine an endpoint address for terminating a secure communication tunnel.

In some instances, each returned network address may include or be associated with a cache instruction for caching the returned network address at a requesting device. For example, the network address for service device A 726 may include a cache instruction to the controller 720 to store the network address for one hour, asserting that the service device A 726 may be reached at the network address for the next hour. After one hour, the cache instruction may instruct the controller 720 to request the network address again from the routing tables 742 of the RNS 714 as the network address assigned to service device A 726 may have changed after the one hour cache time. In general, the cache instruction may instruct a requesting device to cache the returned network address for any length of time or to use the returned network address until notified of a change by an API or expired timer, or to only use the returned network address once and to recheck the RNS 714 for changes to the network address as needed. In operation 808, therefore, the controller 720 may cache the returned network address for service device A 726 based on the caching instructions provided by the RNS 714.

In operation 810, the security environment 712 or controller 720 may establish the secure communication tunnel using the returned network address as an endpoint for the tunnel. For example, security environment 712 may establish secure communication tunnel 732 to service device A 726 or to the edge of cloud network A 722 for routing to service device A. As network address is associated with service device A 726 by cloud network A 722, the secure communication tunnel 732 may securely provide clean traffic to service device A. In a similar manner, secure communication tunnel 734 to service device C 730 or cloud network B 724 may be established using a network address associated with service device C as received from RNS 714. In general, the security environment 712 may establish any number of secure communication tunnels to any number service devices based on network addresses stored in the routing tables 742 and/or cache 740 of the RNS 714. These communication tunnels may also be established to devices or workloads with dynamically assigned network addresses or for devices that are dynamically instantiated in various network environments.

During operation of the secure communication tunnels, the controller 720 may monitor the activity of the tunnels to detect when a provided network address may no longer be associated with or assigned to a service device. For example, service device A 726 may be assigned a first network address by cloud network A 722. At some later point, the cloud network 722 may assign a different network address to service device A 726 during reconfiguration or operation of the cloud network. However, because the secure communication tunnel 732 is established to an endpoint of the first network address of service device A 726, the tunnel may no longer end at the service device once the network address is changed, losing the secure nature of the communication tunnel. Thus, the controller 720 may, in operation 812, monitor the communication tunnel 732 to detect the presence of traffic on the tunnel over a particular period of time. For example, the controller 720 may be configured to monitor the communication tunnel 732 for traffic over a ten-minute period, one hour period, one day period, etc., although the period of time may be any length of time. If no traffic is detected on the communication tunnel 732 over the period of time, the controller 720 may assume the network address for the service device has dynamically changed to another network address. In response, the controller 720 or other network device may return to operation 804 to select a new service device of the available service device or to instantiate a new service device for transmitting cleaned traffic from the security environment 712. After selection of a new destination service device, the controller 720 may access a network address of the new service device for establishing a secure communication tunnel to the new service device through the operations described above.

Returning to operation 812, the controller 720 may detect traffic on the communication tunnel during the time period. In response, the controller 720 may determine, in operation 814, if the cache for the received network address that is used as the endpoint for the secure communication tunnel 732 has expired. As explained above, one or more of the network addresses returned by the RNS 714 may include a caching instruction for caching the network address for a period of time. If the cache period of time has not expired, the controller 720 may reset the activity detection timer for the secure communication tunnel in operation 816 and return to operation 812 to monitor the traffic on the communication tunnel for the monitoring period of time, as described above.

In the instance in which the caching period of time has expired, the controller 720 may return to operation 806 described above and transmit the service or device identifier to the RNS 714 to obtain a network address associated with the target destination service device. In some instances, the network address may have been changed upon expiration of the cache time period such that the controller 720 may receive a new network address for the destination service device. Following receiving the new network address, the controller 720 may cache the address based on a caching instruction associated with the address and establish a secure communication tunnel with an endpoint at the new network address. In other instances, the network address received following the expiration of the cache time period may be the same network address as associated with the expired cache time period. In this circumstance, the controller 720 may receive the same cache instructions as before but may not establish a new secure communication tunnel as a tunnel to the proper endpoint network address is already established. Through the method 800 of FIG. 8, the controller 720 may utilize the RNS 714, and more particularly the mapped device or service identifier to the network address of the service devices to establish one or more dynamic communication tunnels from the security environment 712 to the service devices 726-730.

The mapped service identifiers to network addresses of the RNS 714 may be updated with new network addresses or changes to the configuration of the network environment 700 when a new network address is assigned to a service device and/or when a new instance of a service device is instantiated in a network environment. In particular, FIG. 9 is a flowchart illustrating a method 900 for updating a RNS device 714 for dynamically configuring a security service environment 712, according to aspects of the present disclosure. Similar to the method 800 of FIG. 8, the operations of the method 900 of FIG. 9 may be performed or executed by the controller 720 of the security environment 712, although any device of the network 702 or associated with the network may perform the operations of method. Further, the operations may be performed by one or more hardware components of devices of the network 702, one or more software programs associated with the network, or a combination of both hardware and software components.

Beginning in operation 902, the controller 720 or other network device configured to manage the RNS 714 may receive an update to a network address assigned to a service device for inclusion in the routing tables 742 of the RNS. In one example, the updated network address may be received by a cloud environment, such as cloud network A 722 or cloud network B 724 upon assigning a new network address to a service device 726-730 instantiated within the network. In another example, the controller 720 or other network device may cause the instantiation of a new service device or workload in a network, such as cloud network A 722, cloud network B 724, a compute environment of network 702, or any other network in communication with the controller 720 or network device. Upon instantiation of a new service device, the network in which the service device is instantiated may assign a network address to the device and provide the network address to the controller 720.

In operation 904, the controller 720 may call the RNS 714 to update the routing tables 742 with the network address received above. The controller 720 may provide some indicator of the service identifier or service device to which the network address is associated with for storage in the cache 740 and/or the routing tables 742. One or more APIs 716 of the RNS 714 may be used to communicate with the RNS and to provide the updated network address information. In some instances, the various networks associated with the existing service devices 726-730 or newly established service devices may communicate the updated network address information directly with the RNS 714. For example, cloud network A 722 may include logic to communicate a newly assigned network address to the RNS 714, perhaps utilizing one or more APIs 716 of the RNS. Cloud network B 724 may similarly provide new network address information to RNS 714 via the same or a different API 716. In general, any network hosting an instantiated service device or workload may provide the network address information to the RNS 714. The RNS 714 receiving the network address information may then update the cache 740 and/or routing tables 742 with the received network address information.

In operation 906, the controller 720 or other device, system, or entity that provides a network address for inclusion in the RNS 714 routing table may update a digital ledger 718 with the updated information and an identification of the updating entity or device. The digital ledger 718 may be maintained by the RNS 714 or may be maintained separately from the RNS. In one example, the digital ledger may be a blockchain structure, although other types of secure digital ledgers are contemplated for use with the RNS 714. In general, the digital ledger 718 may be a linked list of secure digital records configured so that, once a record is added to the list, the record cannot be altered without alteration of all subsequent records in the list. The information stored in each record, or "block", may be accessible to view, but is unalterable once added to the record chain.

As new network address information is provide to the RNS 714 for storage in the cache 740 and/or the routing tables 742, a corresponding digital record may be added to the ledger 718. The record may include, among other information, an identifier of the new network address information, an identifier of the corresponding service device associated with the new address, and an identifier of the entity providing the new network address. The digital ledger 718 may, therefore, maintain a record of the entities accessing the RNS 714 and the addresses and devices affected by changes to the routing tables 742. The records may be used to audit or otherwise review changes occurring within the routing tables 742 to troubleshoot issues, track a number of changes requested by a particular entity, determine the last network address associated with a particular service device, and the like.

In operation 908, the controller 720 may transmit the routing information received from the RNS 714 to one or more routing devices within the network 702 to generate the secure communication tunnel 732, 734 through the network to the indicated service device. For example, the controller 720 may communicate with one or more routers or switches of the network 702 and provide the network address received from the RNS 714. The routers and/or switches of the network 702 may update routing tables to identify communications with the received network address as a destination address and route those communications based on the secure communication tunnel protocol. Similar announcements/instructions may also be provided to routing devices in other networks between the network 702 of the security environment 712 and the service device to establish the secure communication tunnel from the security environment to the service device associated with the network address received form the RNS 714.

The network 702 may, in some instances, instantiate more than one RNS 714 system within the network for maintaining network address/service device correlations associated with the security environment 712. In such circumstances, the multiple instances of the RNS 714 may share routing information (such as stored network address, routing tables 742, etc.) and/or digital ledgers 718 such that each RNS may maintain the same routing information. The devices of the network 702 may then access an instance of the RNS 714 that is logically or geographically close to reduce the distance communications with the RNS are transmitted through the network.

Figure 10:
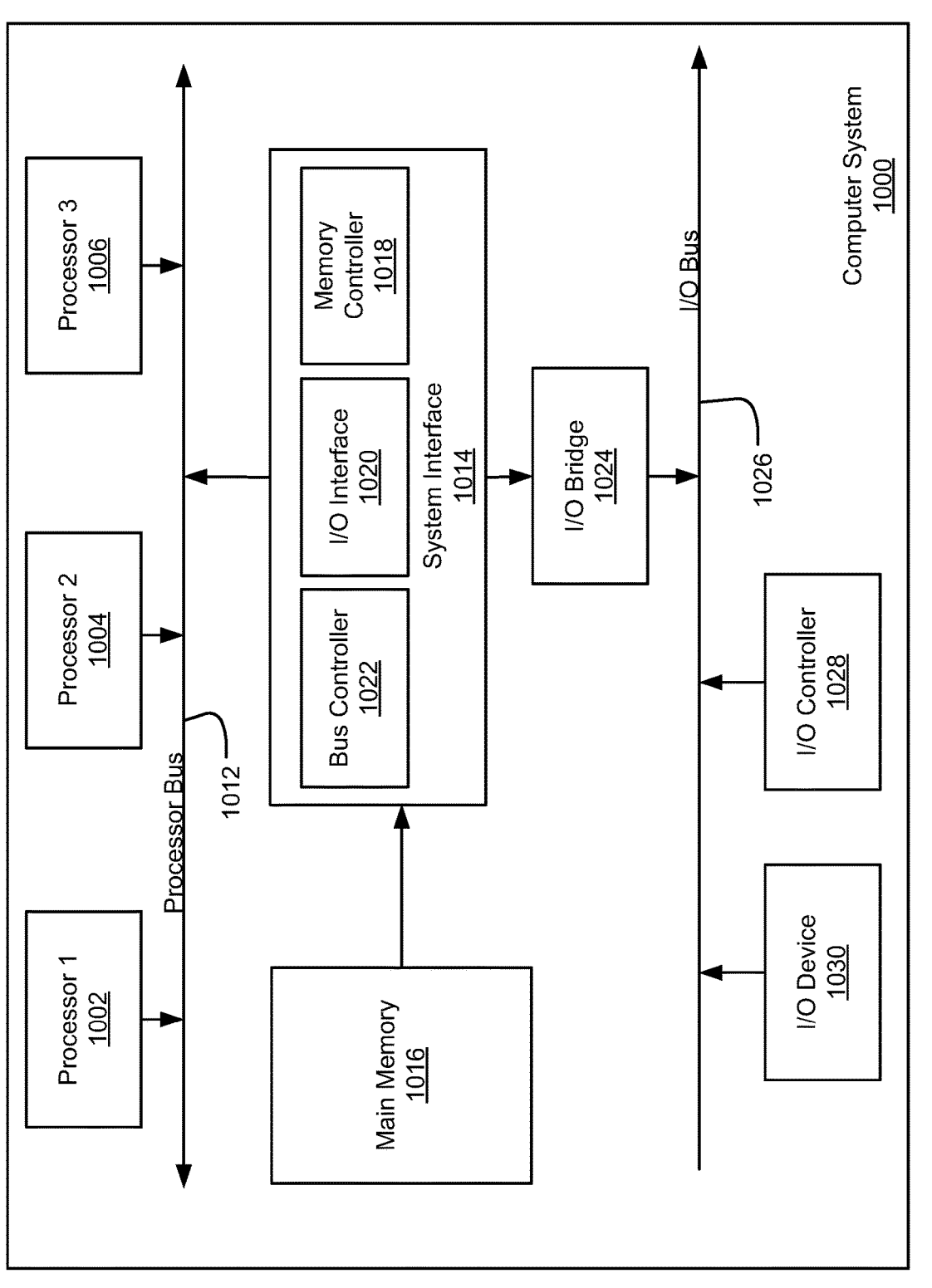
FIG. 10 is a block diagram illustrating an example of a computing system which may be used in implementing embodiments of the present disclosure.

FIG. 10 is a block diagram illustrating an example of a computing device or computer system 1000 which may be used in implementing the embodiments of the components of the network disclosed above. For example, the computing system 1000 of FIG. 10 may be the controller of the security environments discussed above. The computer system (system) includes one or more processors 1002-1006. Processors 1002-1006 may include one or more internal levels of cache (not shown) and a bus controller or bus interface unit to direct interaction with the processor bus 1012. Processor bus 1012, also known as the host bus or the front side bus, may be used to couple the processors 1002-1006 with the system interface 1014. System interface 1014 may be connected to the processor bus 1012 to interface other components of the system 1000 with the processor bus 1012. For example, system interface 1014 may include a memory controller 1018 for interfacing a main memory 1016 with the processor bus 1012. The main memory 1016 typically includes one or more memory cards and a control circuit (not shown). System interface 1014 may also include an input/output (I/O) interface 1020 to interface one or more I/O bridges or I/O devices with the processor bus 1012. One or more I/O controllers and/or I/O devices may be connected with the I/O bus 1026, such as I/O controller 1028 and I/O device 1030, as illustrated.

I/O device 1030 may also include an input device (not shown), such as an alphanumeric input device, including alphanumeric and other keys for communicating information and/or command selections to the processors 1002-1006. Another type of user input device includes cursor control, such as a mouse, a trackball, or cursor direction keys for communicating direction information and command selections to the processors 1002-1006 and for controlling cursor movement on the display device.

System 1000 may include a dynamic storage device, referred to as main memory 1016, or a random access memory (RAM) or other computer-readable devices coupled to the processor bus 1012 for storing information and instructions to be executed by the processors 1002-1006. Main memory 1016 also may be used for storing temporary variables or other intermediate information during execution of instructions by the processors 1002-1006. System 1000 may include a read only memory (ROM) and/or other static storage device coupled to the processor bus 1012 for storing static information and instructions for the processors 1002-1006. The system set forth in FIG. 10 is but one possible example of a computer system that may employ or be configured in accordance with aspects of the present disclosure.

According to one embodiment, the above techniques may be performed by computer system 1000 in response to processor 1004 executing one or more sequences of one or more instructions contained in main memory 1016. These instructions may be read into main memory 1016 from another machine-readable medium, such as a storage device. Execution of the sequences of instructions contained in main memory 1016 may cause processors 1002-1006 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available through a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 1006 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 1016, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

We claim:

1. A system for operating a network, the system comprising:

a processing device; and a non-transitory computer-readable medium encoded with instructions, which when executed by the processing device, cause the processing device to:

generate, based on a service parameter, a performance threshold value for providing a security service for network traffic corresponding to a destination workload;

simulate, on a model of a network configuration, providing the security services for the network traffic;

select, based on a comparison of an output of the simulation to a performance threshold value, a network environment from a plurality of available network environments; and instantiating, in the selected network environment, the destination workload.

2. The system of claim 1 wherein the instructions further cause the processing device to:

monitor a network performance value for providing the security services to the network traffic over a period of time; and modify the model of the network configuration based on the monitored network performance value.

3. The system of claim 1 wherein the instructions further cause the processing device to:

migrate, based on the selection of the network environment, a secure communication tunnel to connect to the destination workload.

4. The system of claim 1 wherein the network environment comprises at least one of a public cloud environment, a private cloud environment, or a compute environment of the network.

5. The system of claim 4 wherein the network performance values comprise one of a maximum transmission speed, an expected packet loss, or an available bandwidth.

6. The system of claim 5 wherein the performance threshold is based on a service level agreement.

* * * * *